United States Patent
Abe et al.

(10) Patent No.: US 9,834,247 B2
(45) Date of Patent: Dec. 5, 2017

(54) DRIVE DEVICE

(71) Applicant: DENSO CORPORATION, Kariya, Aichi-pref. (JP)

(72) Inventors: Tatsuya Abe, Kariya (JP); Yasufumi Matsuo, Kariya (JP); Shuhei Miyachi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/363,219

(22) Filed: Nov. 29, 2016

(65) Prior Publication Data
US 2017/0158223 A1 Jun. 8, 2017

(30) Foreign Application Priority Data

Dec. 8, 2015 (JP) .................................. 2015-239274

(51) Int. Cl.
| | |
|---|---|
| *B62D 5/04* | (2006.01) |
| *H02K 11/00* | (2016.01) |
| *H02K 11/33* | (2016.01) |
| *H02K 11/30* | (2016.01) |
| *H02K 5/10* | (2006.01) |
| *B62D 3/12* | (2006.01) |

(52) U.S. Cl.
CPC .............. *B62D 5/046* (2013.01); *B62D 3/12* (2013.01); *B62D 5/0421* (2013.01); *H02K 5/10* (2013.01); *H02K 11/30* (2016.01); *H02K 11/33* (2016.01)

(58) Field of Classification Search
CPC ...... H02K 11/0073; H02K 11/33; H02K 5/10; H02K 5/225; H02K 5/18; H02K 5/22; H02K 11/30; B62D 5/046; B62D 5/0421; B62D 3/12
USPC ..................................... 310/68 R, 64, 89, 91
See application file for complete search history.

(56) References Cited

U.S. PATENT DOCUMENTS

| | | | |
|---|---|---|---|
| 2013/0257193 A1* | 10/2013 | Toda ........................ | H02K 5/10 310/52 |
| 2013/0257232 A1* | 10/2013 | Tomizawa ............. | H02K 29/08 310/68 R |
| 2015/0115754 A1 | 4/2015 | Yamasaki | |
| 2015/0115755 A1 | 4/2015 | Yamasaki et al. | |
| 2015/0171709 A1* | 6/2015 | Ito .......................... | H02K 5/225 310/52 |
| 2015/0180316 A1 | 6/2015 | Maeshima | |

(Continued)

*Primary Examiner* — Joseph Rocca
*Assistant Examiner* — Daniel Yeagley
(74) *Attorney, Agent, or Firm* — Knobbe, Martens, Olson & Bear, LLP

(57) ABSTRACT

A connector unit of a drive device includes an electric power supply connector, a signal connector, a base portion and leg portions and is fixed to an opposite side of a heat sink, which is opposite from an electric motor. The leg portions are formed at an outer peripheral edge of the base portion. A cover member receives the connector unit and the heat sink in the state where the electric power supply connector and the signal connector are exposed from the cover member. A connector side O-ring is installed between the base portion and the cover member. A height position of a first end surface of each leg portion is on a first side of a second base end surface of the base portion. With this construction, it is possible to limit deterioration of waterproofness of the drive device caused by a thermal load.

5 Claims, 22 Drawing Sheets

(56) References Cited

U.S. PATENT DOCUMENTS

| | | | |
|---|---|---|---|
| 2016/0094175 A1* | 3/2016 | Yamasaki | H02P 29/68 318/724 |
| 2016/0134170 A1* | 5/2016 | Park | H02K 5/225 310/71 |
| 2016/0254732 A1* | 9/2016 | Kojima | B62D 5/0406 |
| 2016/0276764 A1 | 9/2016 | Sugiura et al. | |
| 2017/0008554 A1* | 1/2017 | Hirotani | H02K 11/024 |

* cited by examiner

DRIVE DEVICE

CROSS REFERENCE TO RELATED APPLICATION

This application is based on and incorporates herein by reference Japanese Patent Application No. 2015-239274 filed on Dec. 8, 2015.

TECHNICAL FIELD

The present disclosure relates to a drive device.

BACKGROUND ART

An electric motor drive device for an electric power steering apparatus has been known. For example, JP2015-134598A (corresponding to US2015/0180316A) discloses the electric motor drive device, in which O-rings are respectively installed at an installation location between a connector case and a heat sink and an installation location between the heat sink and a motor cover.

In the electric motor drive device of JP2015-134598A (corresponding to US2015/0180316A), in a case where an electronic control unit is exposed to a temperature change to cause warping of a corresponding constituent member, a compression ratio of the corresponding O-ring may possibly be reduced to cause deterioration of waterproofness of the electric motor drive device.

SUMMARY

The present disclosure is made in view of the above point. According to the present disclosure, there is provided a drive device that includes an electric rotating machine, a holding member, a connector unit, a cover member and a seal member. The holding member is placed on one side of the electric rotating machine in an axial direction. The connector unit is fixed to a side of the holding member, which is opposite from the electric rotating machine in the axial direction. The connector unit includes a connector portion, a base portion and a leg portion. The connector portion is formed to be connectable with an electric wiring. The connector portion is formed in a base portion. The leg portion is formed at an outer peripheral edge of the base portion and is used to connect the connector unit to the holding member. The cover member receives the connector unit and the holding member in a state where the connector portion is exposed from the cover member. The seal member is placed between the base portion and the cover member. One side of the connector unit, which is opposite from the electric rotating machine, is defined as a first side. Another side of the connector unit, at which the electric rotating machine is placed, is defined as a second side. A position in the axial direction is defined as a height position. The seal member is placed at a first base end surface that is an end surface of the base portion located on the first side. A height position of a first side end surface of the leg portion, which is located on the first side, is on the first side of a second base end surface of the base portion that is another end surface of the base portion located on the second side.

BRIEF DESCRIPTION OF THE DRAWINGS

The drawings described herein are for illustration purposes only and are not intended to limit the scope of the present disclosure in any way.

DETAILED DESCRIPTION

A drive device of the present disclosure will be described with reference to the drawings. In the following discussion, the components, which are substantially identical to each other, are indicated by the same reference signs and will not be redundantly described for the sake of simplicity.

First Embodiment

FIGS. 1 to 19 show a first embodiment of the present disclosure.

Figure 1:
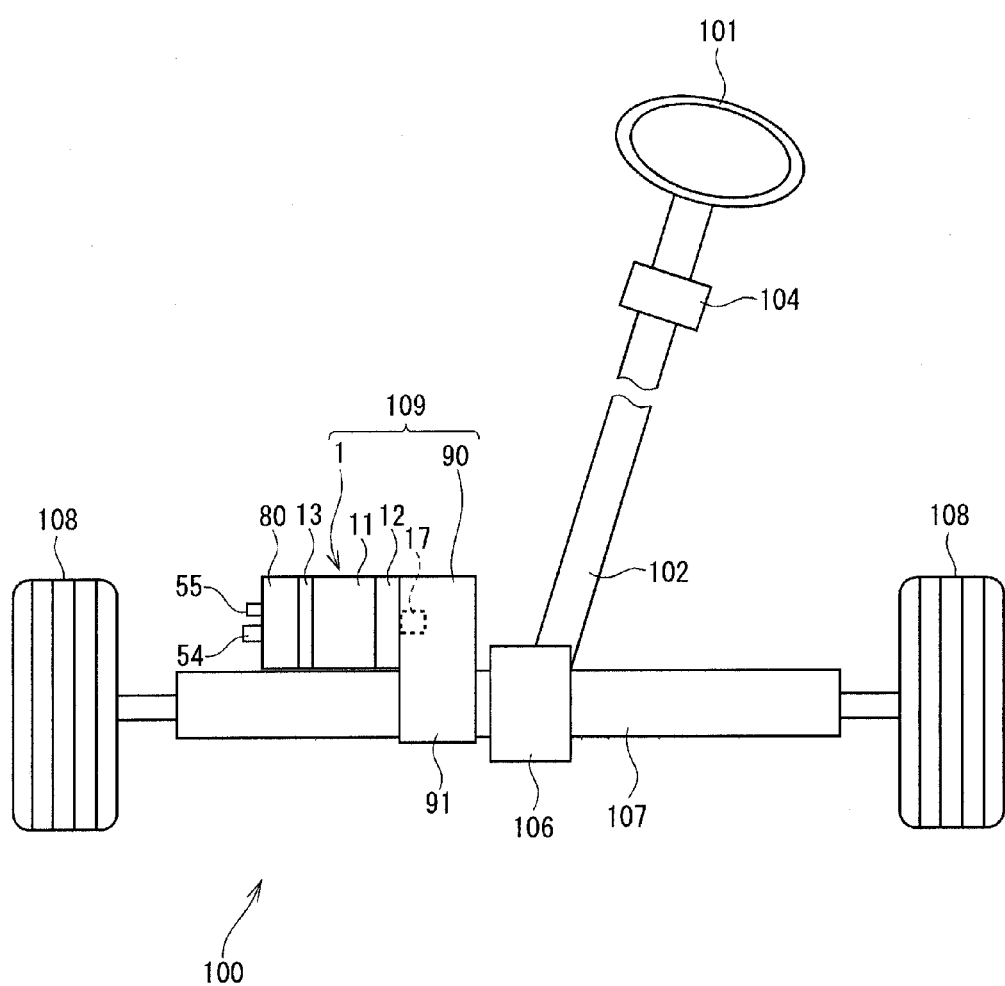
FIG. 1 is a schematic diagram showing a structure of a steering system according to a first embodiment of the present disclosure.
Figure 2:
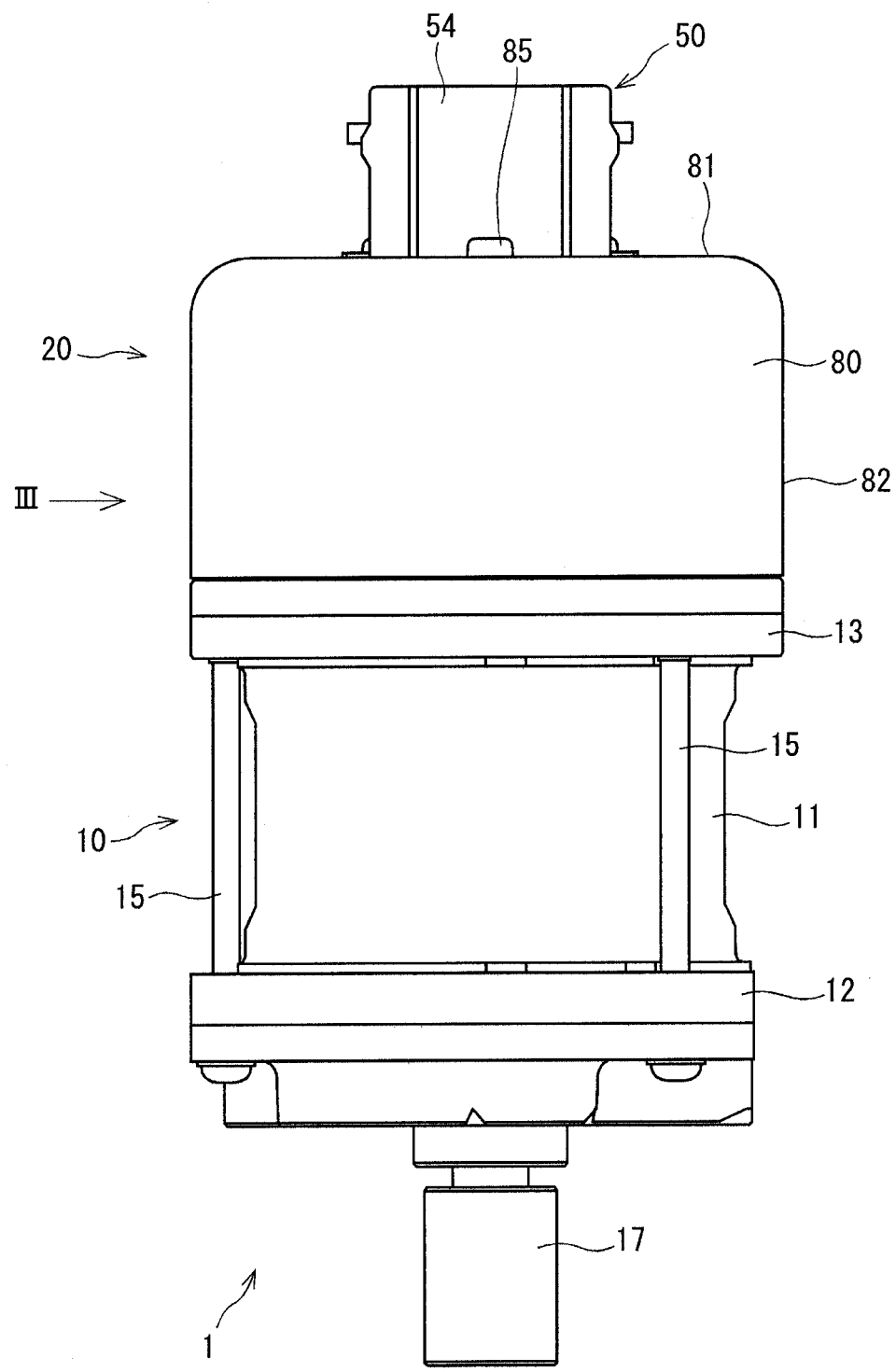
FIG. 2 is a side view of a drive device according to the first embodiment.

As shown in FIGS. 1 and 2, the drive device 1 of the present embodiment includes an electric motor (serving as an electric rotating machine) 10 and a controller unit 20 and is applied to an electric power steering apparatus 109.

FIG. 1 shows an entire structure of a steering system 100 that has the electric power steering apparatus 109. The steering system 100 includes a steering wheel (serving as a steering member) 101, a steering shaft 102, a pinion gear 106, a rack shaft 107, wheels 108 and the electric power steering apparatus 109.

The steering wheel 101 is connected to the steering shaft 102. A torque sensor 104 is installed to the steering shaft 102. The torque sensor 104 senses a torque that is applied to the steering shaft 102 from the steering wheel 101 when a driver of a vehicle operates the steering wheel 101. A pinion gear 106 is installed to a distal end of the steering shaft 102. The pinion gear 106 is meshed with the rack shaft 107. Two wheels 108 are installed to two ends, respectively, of the rack shaft 107 through, for example, tie rods.

When the driver of the vehicle rotates the steering wheel 101, the steering shaft 102, which is connected to the steering wheel 101, is rotated. Rotational motion of the steering shaft 102 is converted into linear motion of the rack shaft 107 through the pinion gear 106. The wheels 108 are steered to a corresponding angle that corresponds to the amount of displacement of the rack shaft 107.

The electric power steering apparatus 109 includes the drive device 1 and a speed reducing gear arrangement 90. The speed reducing gear arrangement 90 is a drive force transmission device that reduces a rotational speed of rotation transmitted from the electric motor 10 and outputs the rotation of the reduced rotational speed to the rack shaft 107. In the present embodiment, the drive device 1 is installed to a housing 91 of the speed reducing gear arrangement 90. That is, the electric power steering apparatus 109 of the present embodiment is an electric power steering apparatus of a rack assist type that assists the driving of the rack shaft 107.

With reference to FIG. 2, the electric motor 10 includes a stator, a rotor and a shaft (not shown), and the shaft is rotated integrally with the rotor. The stator, the rotor and the shaft are received in a motor case 11. The electric motor 10 is, for example, a three-phase AC brushless motor (three-phase AC motor) and is driven when an electric power is supplied to the electric motor 10 from a battery (not shown) of the vehicle.

The motor case 11 is made of metal, such as iron, and is shaped into a tubular form. A front frame 12 is installed to one side of the motor case 11 in the axial direction, and a rear frame 13 is installed to another side of the motor case 11 in the axial direction. Through bolts 15 are inserted from the front frame 12 side and are fixed to the rear frame 13. Thereby, the front frame 12 and the rear frame 13 are fixed together in a state where the motor case 11 is clamped between the front frame 12 and the rear frame 13. In the present embodiment, the motor case 11, the front frame 12 and the rear frame 13 form an outer shell of the electric motor 10.

An output end 17, which is rotated integrally with the shaft of the electric motor 10, is exposed from the front frame 12. The output end 17 is connected to the speed reducing gear arrangement 90. The rotation of the electric motor 10 is outputted to the speed reducing gear arrangement 90.

In this discussion, an axial direction and a radial direction of the electric motor 10 will be respectively regarded as an axial direction and a radial direction of the drive device 1 and will be merely referred to as "an axial direction" and "a radial direction" in this discussion. Furthermore, an axis of the shaft of the electric motor 10 will be simply referred to as an axis.

As shown in FIGS. 2 to 5, the controller unit 20 includes a heat sink (serving as a holding member) 30, a control circuit board 41, a power circuit board 43, power modules 45 and a connector unit 50 and is arranged such that the controller unit 20 is entirely placed within an imaginary projected area, which is formed by projecting the electric motor 10 in the axial direction. The controller unit 20 is fixed to the rear frame 13 in a state where a portion of the controller unit 20, which is located on the electric motor 10 side, is received in the rear frame 13. Furthermore, an opposite side of the controller unit 20, which is opposite from the electric motor 10, is covered with a cover member 80 (see FIG. 2).

Figure 3:
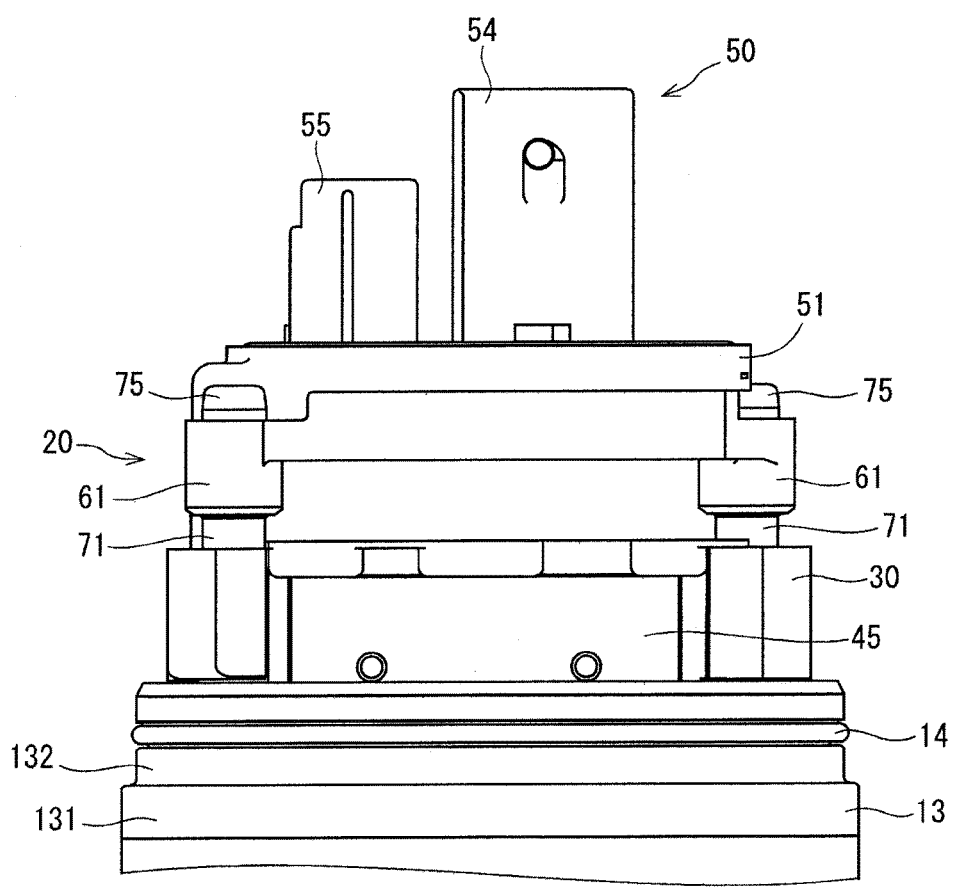
FIG. 3 is a side view showing a controller unit according to the first embodiment.

As shown in FIG. 3, the rear frame 13 includes an exposed portion 131 and an inserted portion 132. The inserted portion 132 is formed on a side of the exposed portion 131 that is opposite from the electric motor 10. The exposed portion 131 is exposed from the cover member 80. The inserted portion 132 is inserted into the cover member 80. An O-ring groove, which is shaped into a ring form, is formed in a peripheral wall of the inserted portion 132, and a motor side O-ring 14 is fitted into the O-ring groove. The motor side O-ring 14 is made of a resilient member, such as rubber, and is shaped into a ring form.

FIG. 3 is a view taken in a direction of an arrow III in FIG. 2, and the electric motor 10 is omitted in FIG. 3 for the sake of simplicity.

As shown in FIG. 2, the cover member 80 is shaped into a tubular form having a bottom. Specifically, the cover member 80 includes a top portion 81 and a tubular portion 82. The top portion 81 is placed on an opposite side of the tubular portion 82, which is opposite from the electric motor 10. The controller unit 20 is received in an inside of the cover member 80. Specifically, the controller unit 20 of the present embodiment is placed in a receiving space that is formed by the rear frame 13 and the cover member 80.

A connector inserting hole is formed in the top portion 81, and an electric power supply connector 54 and a signal connector 55 are inserted into the connector inserting hole from the electric motor 10 side. In this way, the electric power supply connector 54 and the signal connector 55 are exposed from the cover member 80. Furthermore, screw inserting holes are formed in the top portion 81 such that cover fixing screws 85 are inserted through the screw inserting holes from the opposite side of the top portion 81 that is opposite from the electric motor 10. The cover fixing screws 85 are fixed to the connector unit 50. Thereby, the cover member 80 is fixed to the connector unit 50.

The inserted portion 132 of the rear frame 13 is inserted at a distal end side of the tubular portion 82. The motor side O-ring 14 is clamped between the inserted portion 132 of the rear frame 13 and an inner wall of the tubular portion 82 of the cover member 80 in a compressed state where the motor side O-ring 14 is compressed at a compression ratio that is within a specified range. Thereby, the motor side O-ring 14 gas-tightly or liquid-tightly (fluid-tightly) seals between the rear frame 13 and the cover member 80.

As shown in FIGS. 4 to 7, the heat sink 30 includes a heat releasing portion 31, inserting hole forming portions 33, control circuit board fixing portions 34, power circuit board fixing portions 35 and connector fixing portions 37 and is made of a material (e.g., aluminum), which has a good heat conductivity. The heat sink 30 functions as the holding member that holds the control circuit board 41, the power circuit board 43 and the power modules 45, which are electronic components that are used in a drive control operation of the electric motor 10.

The heat releasing portion 31 is shaped into a column form that has a generally rectangular shape in a side view thereof. The heat releasing portion 31 includes two module fixing surfaces 311 that are placed at two opposite sides, which are opposed to each other about the axis, and the power modules 45 are fixed to the module fixing surfaces 311, respectively. A receiving chamber 32 is formed in an inside of the heat releasing portion 31 and opens on a side that is opposite from the electric motor 10. The receiving chamber 32 receives relatively large electronic components, such as a capacitor and a choke coil, which are installed to the heat sink 30 side surface of the power circuit board 43.

Inserting holes 331 are formed in the inserting hole forming portions 33, respectively. Controller fixing screws (not shown) to be fixed to the rear frame 13 are inserted into the inserting holes 331, respectively. The controller unit 20 is fixed to the rear frame 13 by fixing the controller fixing screws to the rear frame 13.

Control circuit board fixing screws 42 are fixed to the control circuit board fixing portions 34, respectively, in a state where the control circuit board 41 is held between each of the control circuit board fixing portions 34 and a corresponding one of the control circuit board fixing screws 42. In this way, the control circuit board 41 is held by the heat sink 30.

Power circuit board fixing screws 44 are fixed to the power circuit board fixing portions 35 in a state where the power circuit board 43 is held between each of the power circuit board fixing portions 35 and a corresponding one of the power circuit board fixing screws 44. In this way, the power circuit board 43 is held by the heat sink 30.

The connector unit 50 is fixed to the connector fixing portions 37 with connector fixing screws 75.

The number of the control circuit board fixing portions 34 is two, and these control circuit board fixing portions 34 are symmetrically arranged about the axis. Also, the number of the power circuit board fixing portions 35 is two, and these power circuit board fixing portions 35 are symmetrically arranged about the axis. Similarly, the number of the connector fixing portions 37 is two, and these connector fixing portions 37 are symmetrically arranged about the axis.

The control circuit board 41 is installed to the electric motor 10 side of the heat sink 30. Electronic components, such as a microcomputer and a pre-driver, each of which requires the relatively small amount of electric power supply, are installed to the control circuit board 41.

The power circuit board 43 is placed on the opposite side of the heat sink 30, which is opposite from the electric motor 10. Electronic components, such as a capacitor and a choke coil, each of which has a relatively large size and requires the relatively large amount of electric power supply, are installed to the power circuit board 43.

Figure 4:
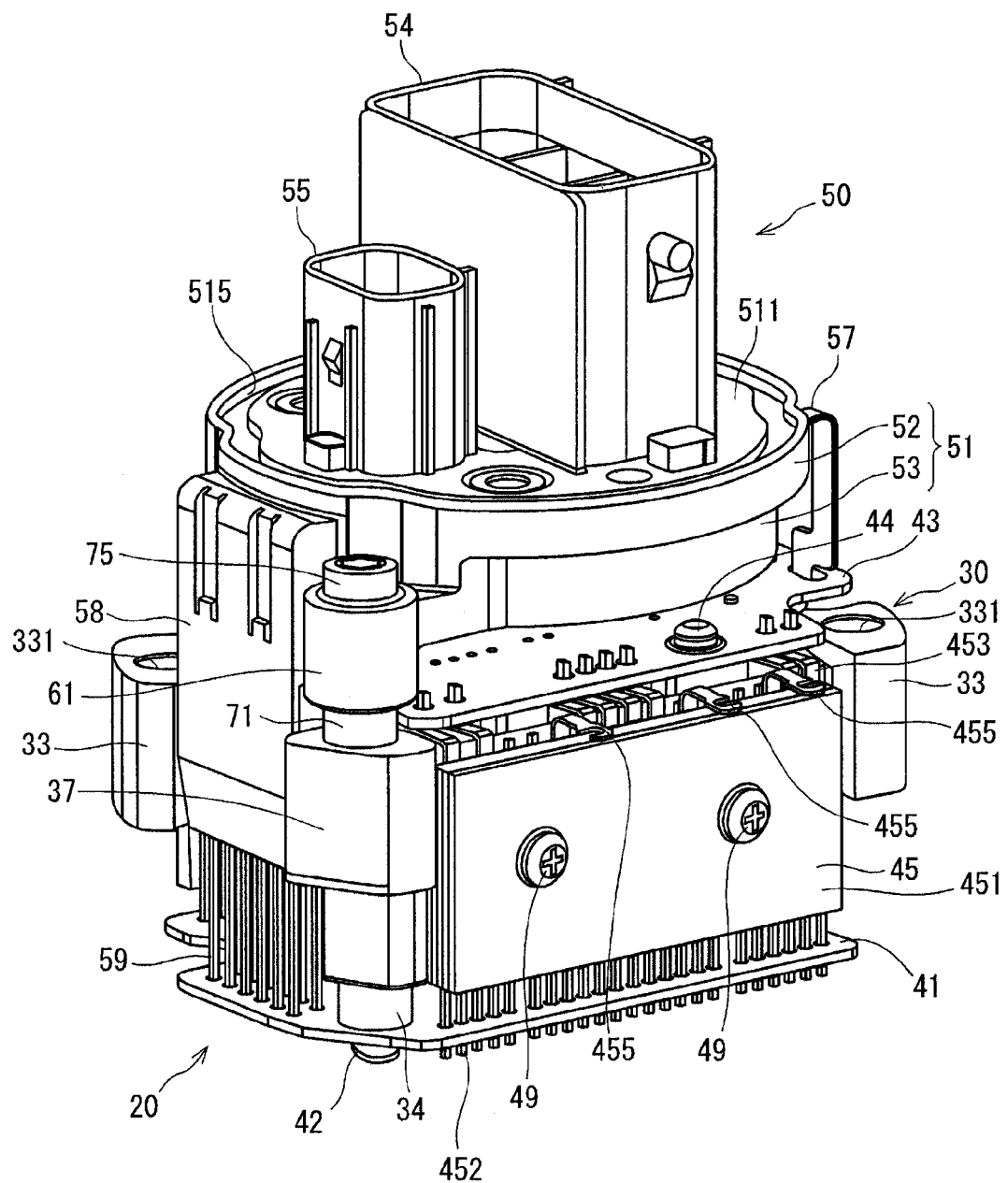
FIG. 4 is a perspective view showing the controller unit according to the first embodiment.

With reference to FIG. 4, each of the power modules 45 includes a plurality of switching devices (not shown), which form an inverter that is configured to switch an electric current supplied to windings of the stator of the electric motor 10. The switching devices are sealed in a package portion 451 of the power module 45.

In the present embodiment, two sets of three-phase windings are provided, and each set of three-phase windings is provided with a corresponding one of the inverters. Furthermore, each of the power modules 45 includes the corresponding one of the inverters. That is, in the present embodiment, the number of the power modules 45 is two. Each of the power modules 45 is fixed to the heat sink 30 with module fixing screws 49 in a state where a wide surface of the power module 45 contacts the corresponding one of the module fixing surfaces 311. Thereby, when heat is generated through, for example, a switching operation of the switching devices of the power module 45, the generated heat is released to the heat sink 30. A heat releasing member, such as a heat releasing sheet or heat releasing gel, may be placed between the power module 45 and the heat sink 30.

Each of the power modules 45 includes control terminals 452, power terminals 453 and motor terminals 455, which are respectively projected from the package portion 451.

The control terminals 452 project toward the electric motor 10 side of the package portion 451. The control terminals 452 are inserted through terminal inserting holes of the control circuit board 41 and are electrically connected to the control circuit board 41 through, for example, soldering.

The power terminals 453 project from the opposite side of the package portion 451, which is opposite from the electric motor 10. The power terminals 453 are bent toward the heat sink 30 side. The power terminals 453 are then inserted through terminal inserting holes of the power circuit board 43 and are electrically connected to the power circuit board 43 through, for example, soldering.

The motor terminals 455 project from the opposite side of the package portion 451, which is opposite from the electric motor 10. A wire inserting portion is formed at a distal end of each of the motor terminals 455. The motor terminals 455 are bent in a direction away from the heat sink 30. Pulled wires (not shown), which are pulled away from the windings of the electric motor 10, are respectively inserted into the wire inserting portions of the motor terminals 455. Each of the motor terminals 455 and the corresponding one of the pulled wires are electrically connected together through, for example, soldering.

Figure 13:
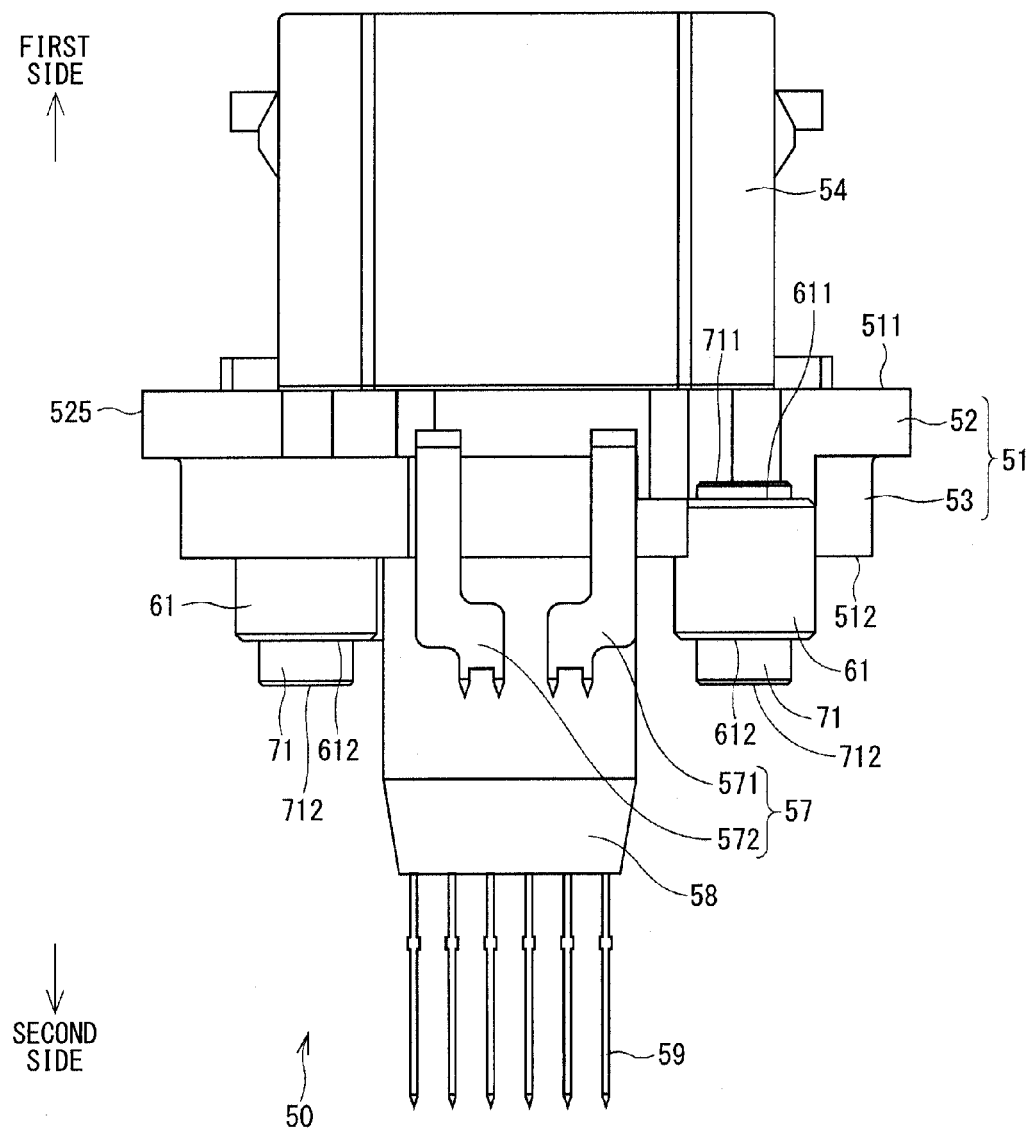
FIG. 13 is a view taken in a direction of an arrow XIII in FIG. 9.
Figure 14:
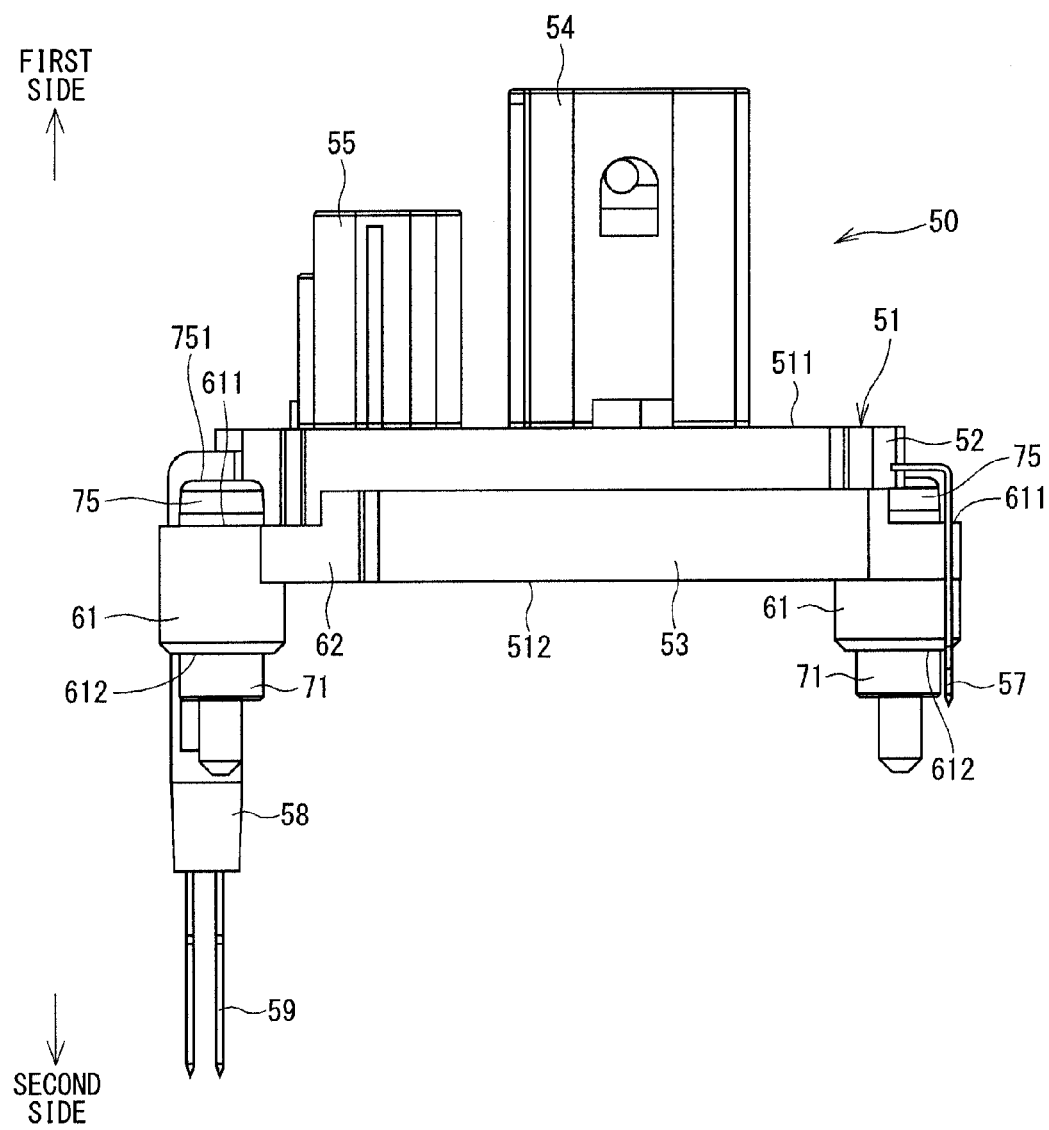
FIG. 14 is a side view showing the connector unit and connector fixing screws according to the first embodiment.
Figure 15:
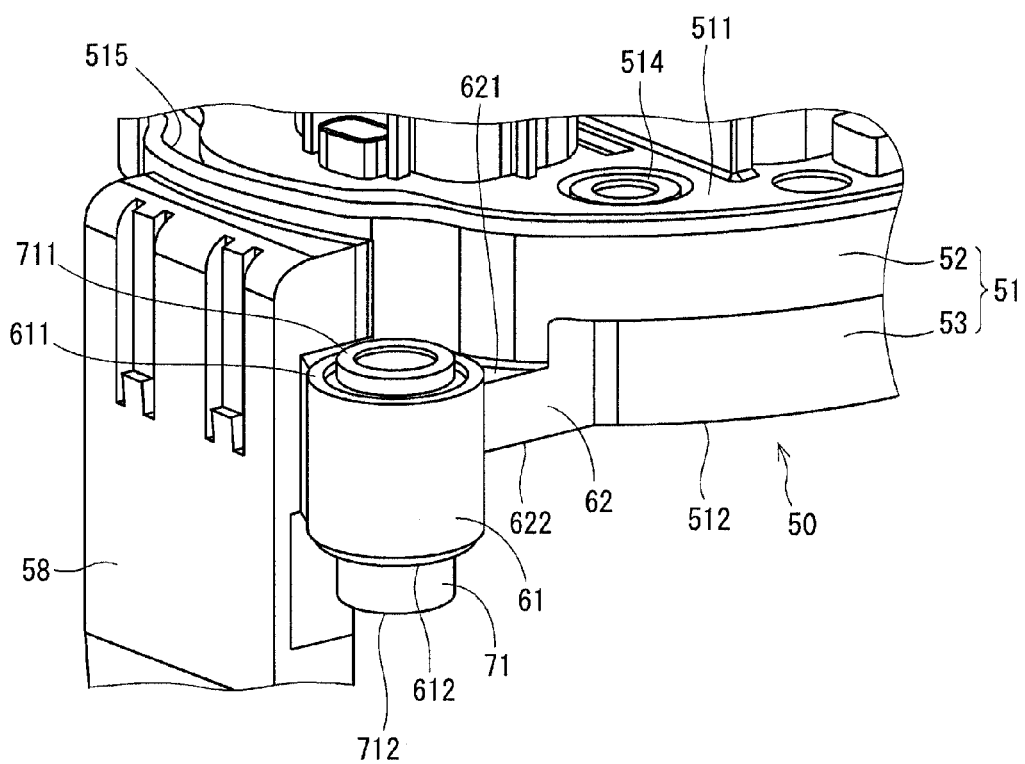
FIG. 15 is a perspective view showing a leg portion of the connector unit according to the first embodiment.
Figure 16:
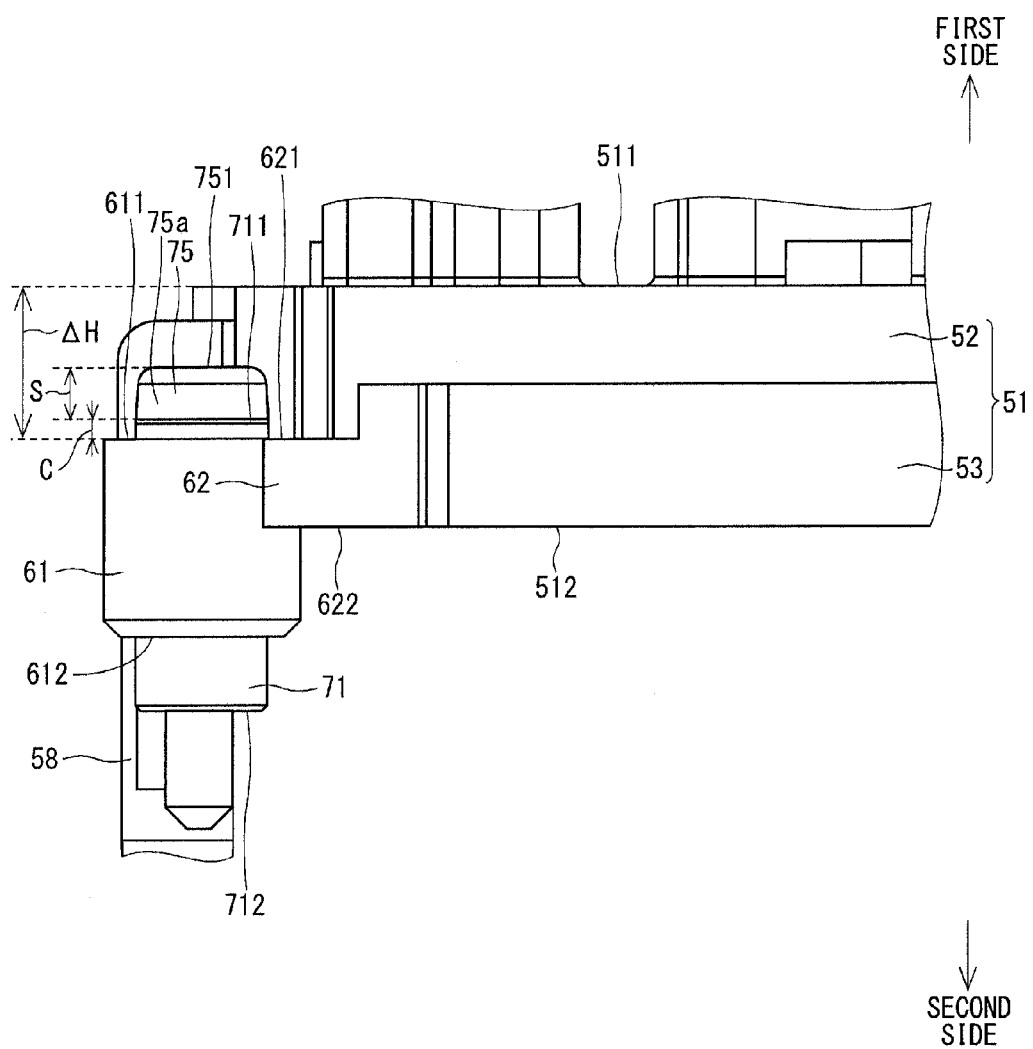
FIG. 16 is a side view showing the leg portion of the connector unit according to the first embodiment.
Figure 17:
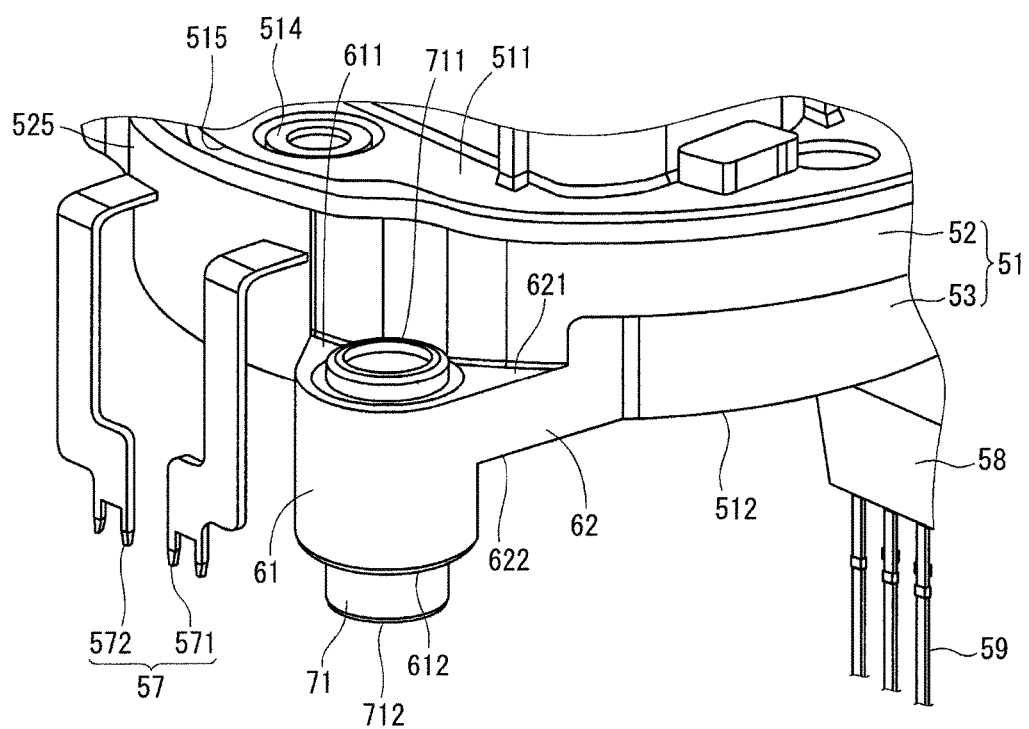
FIG. 17 is a perspective view showing the leg portion of the connector unit according to the first embodiment.
Figure 18:
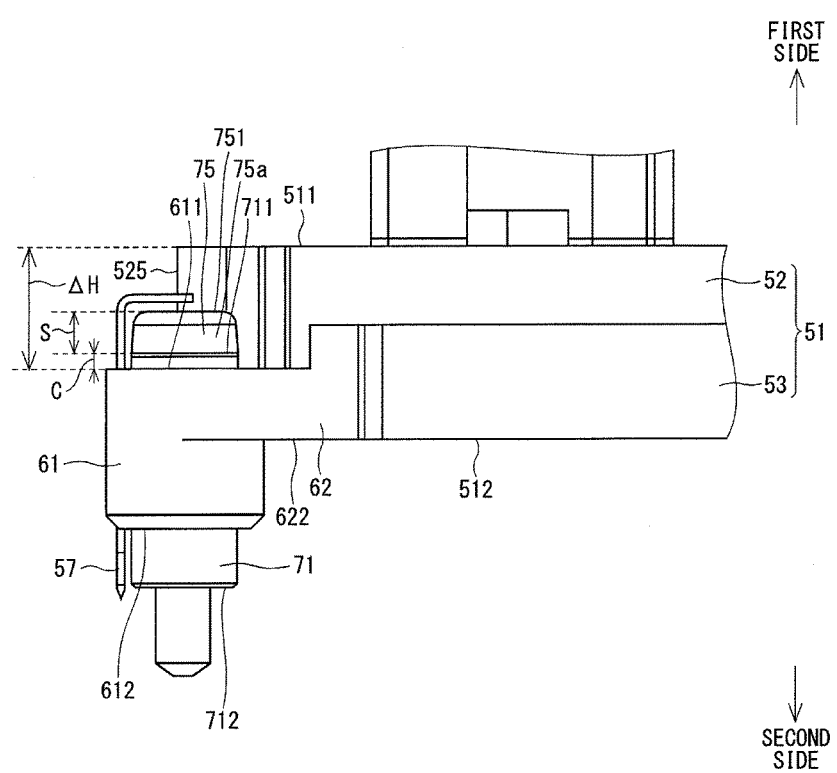
FIG. 18 is a side view showing the leg portion of the connector unit according to the first embodiment.

FIGS. 8 to 18 show the connector unit 50. FIG. 14 corresponds to FIG. 10 and shows a state where the collars 71 and the connector fixing screws (fixing members) 75 are installed to the connector unit 50. FIGS. 15 to 18 are enlarged views showing an area around the leg portion 61. FIG. 16 is an enlarged view that corresponds to a view taken in a direction of an arrow X in FIG. 9. FIG. 18 is an enlarged view that corresponds to a view taken in a direction of an arrow XI in FIG. 9. FIGS. 16 and 18 show a state where the connector fixing screws 75 are installed. However, it should be noted that the connector fixing screws 75 are omitted from FIG. 9.

The connector unit 50 includes a base portion 51, the electric power supply connector 54, the signal connector 55, electric power supply terminals 57, a signal terminal holding portion 58, signal terminals 59 and the leg portions 61 and is made of, for example, resin. The connector unit 50 is placed on the opposite side of the heat sink 30, which is opposite from the electric motor 10.

Figure 10:
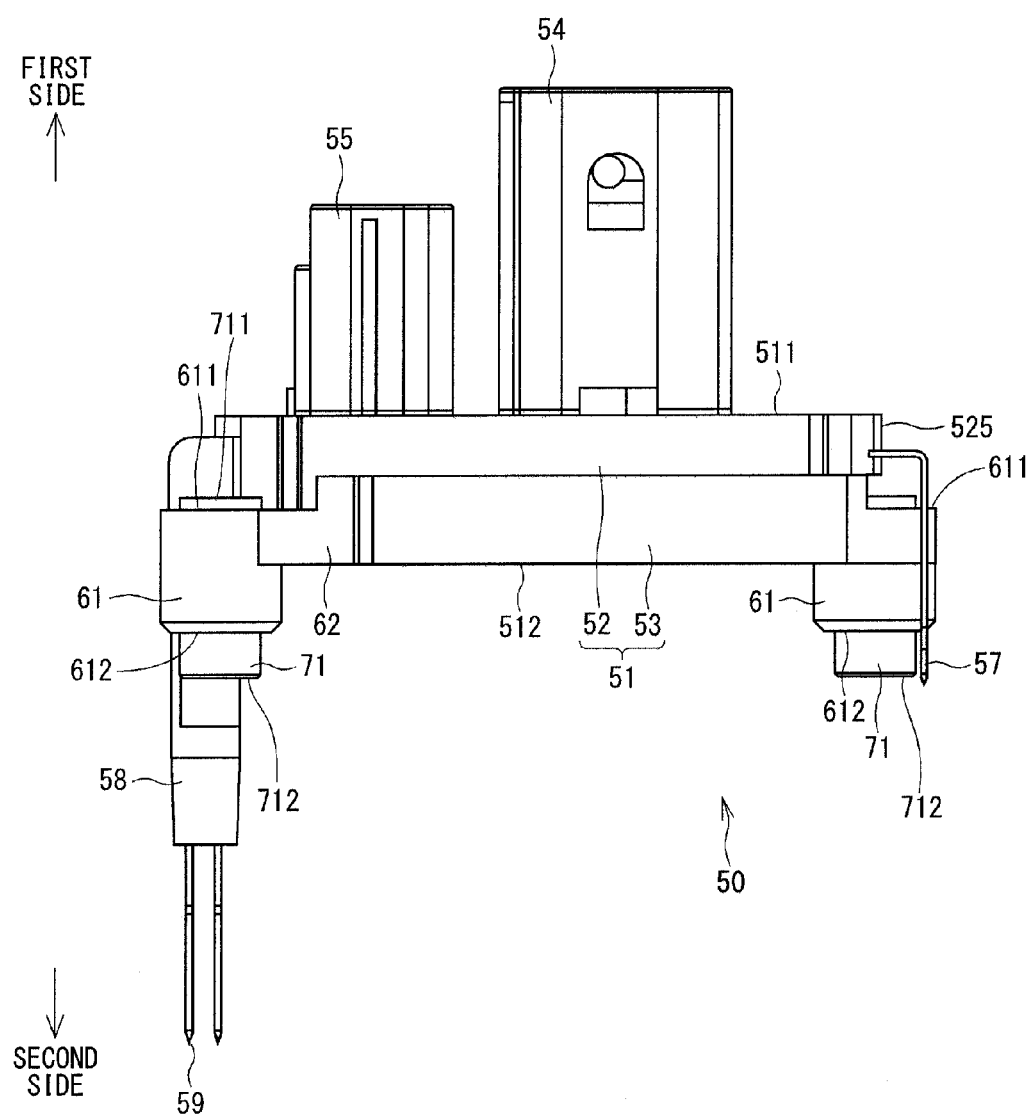
FIG. 10 is a view taken in a direction of an arrow X in FIG. 9.
Figure 11:
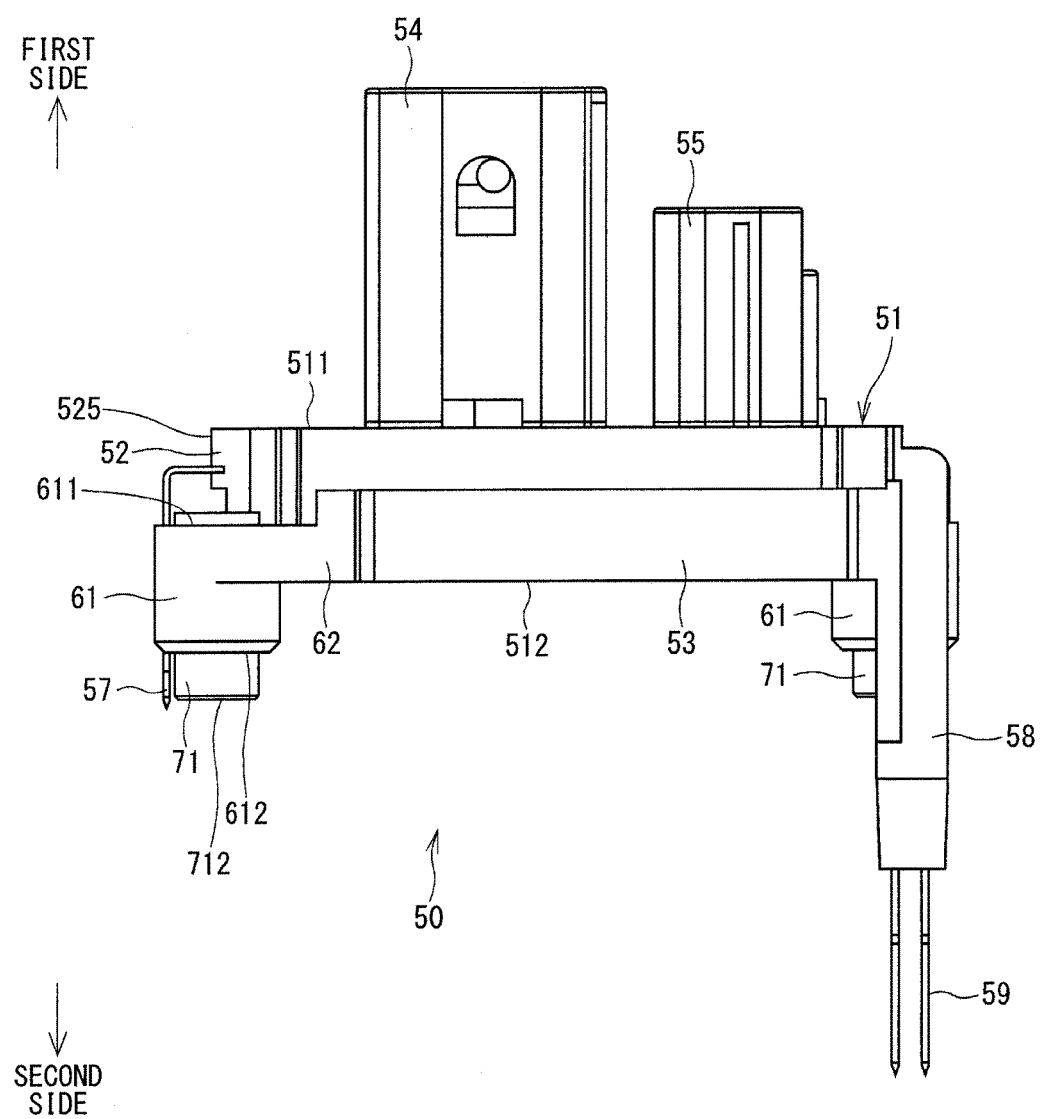
FIG. 11 is a view taken in a direction of an arrow XI in FIG. 9.
Figure 12:
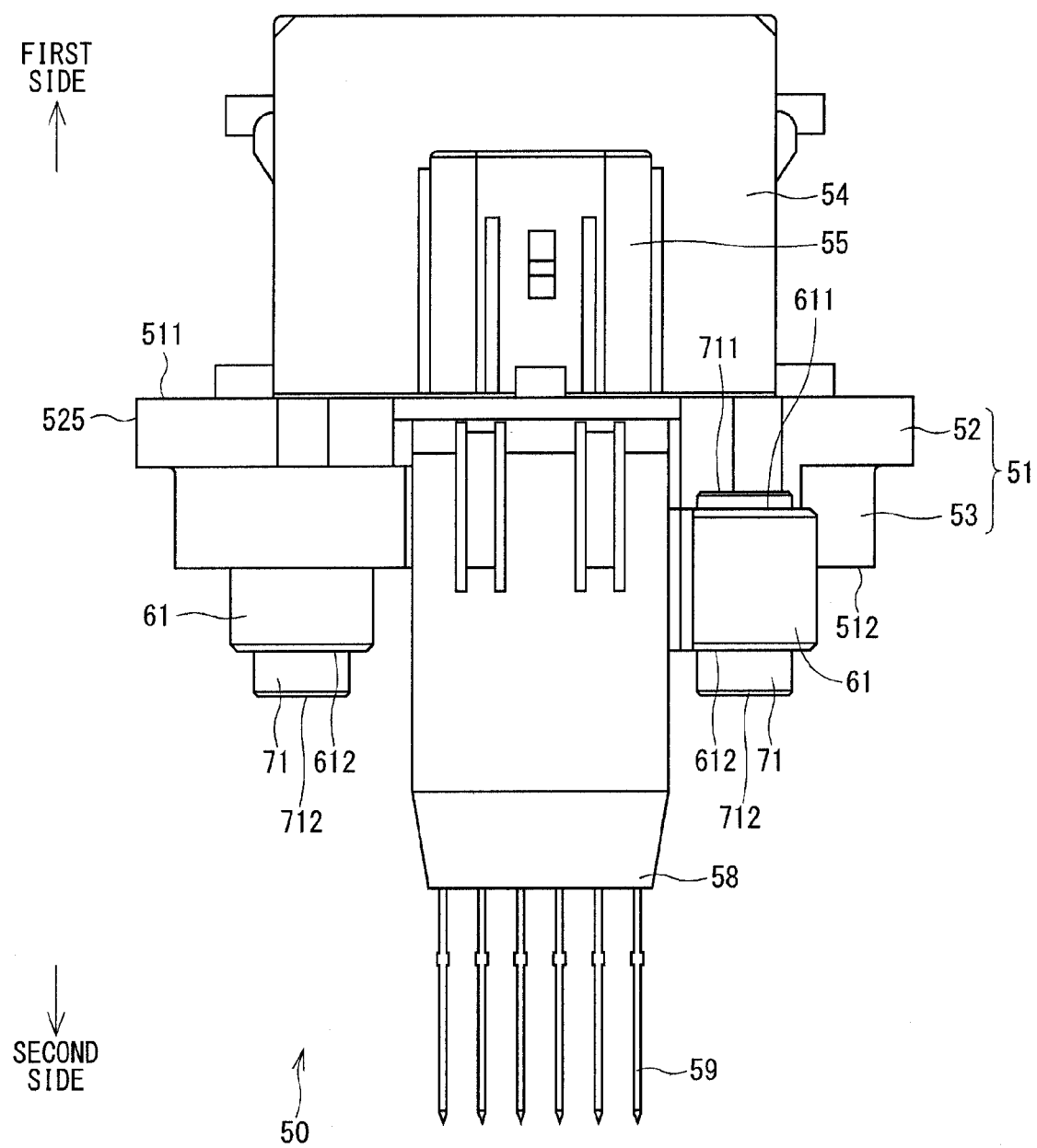
FIG. 12 is a view taken in a direction of an arrow XII in FIG. 9.

Here, one side of the connector unit 50, which is opposite from the electric motor 10 in the axial direction, is defined as a first side, and another side of the connector unit 50, at which the electric motor 10 is placed, is defined as a second side (see, for example, FIG. 10).

The base portion 51 includes a main base portion 52 and a reinforcing portion 53. The main base portion 52 is shaped into a generally circular disk form. The reinforcing portion 53 is placed on a radially inner side of a peripheral wall 525 of the main base portion 52 and axially projects from the main base portion 52 toward the second side. Ribs may be arbitrarily formed in an inside of the reinforcing portion 53.

The warp of the main base portion 52, which is caused by a thermal load, is limited through provision of the reinforcing portion 53.

Here, a first side end surface of the base portion 51, which is located on the first side, will be referred to as a first base end surface 511, and a second side end surface of the base portion 51, which is located on the second side, will be referred to as a second base end surface 512. In the present embodiment, the first base end surface 511 serves as a first side end surface of the main base portion 52, which is located on the first side, and the second base end surface 512 is a second side end surface of the reinforcing portion 53, which is located on the second side. Here, it should be noted that the second base end surface 512 may be an imaginary surface (imaginary plane) that is defined by a second side end portion, such as the ribs, of the base portion 51.

The base portion 51 is spaced from the heat sink 30 and the power circuit board 43 (the power circuit board 43 being fixed to the surface of the heat sink 30 that is opposite from the electric motor 10). With this construction, in the state where the connector unit 50 is installed to the heat sink 30, it is possible to visually check a terminal connecting state of the power circuit board 43 from the connector unit 50 side in an oblique direction that is oblique to the axial direction. Furthermore, electrical insulation between the connector unit 50 and the power circuit board 43 can be maintained.

Cover fixing portions 514 are formed in the first base end surface 511. In the present embodiment, the number of the cover fixing portions 514 is three. The cover fixing screws 85 are fixed to the cover fixing portions 514, respectively (see FIG. 2). Thereby, the cover member 80 is fixed to the connector unit 50.

Figure 9:
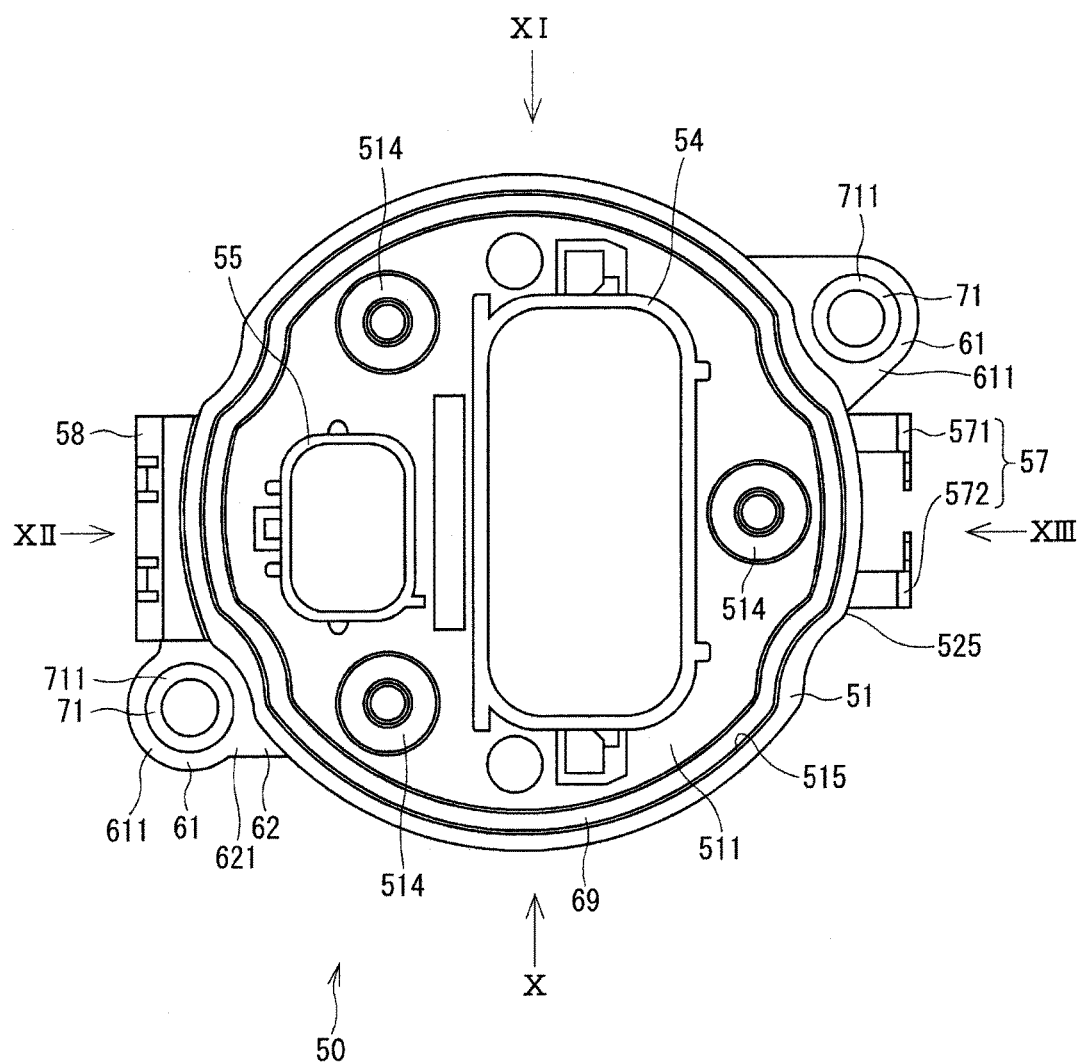
FIG. 9 is a plan view showing the connector unit according to the first embodiment.

An O-ring groove 515, which is shaped into a ring form, is formed in the first base end surface 511 at a location that is on a radially outer side of the electric power supply connector 54 and the signal connector 55. As shown in FIG. 9, a connector side O-ring (serving as a seal member) 69 is placed in the O-ring groove 515. The connector side O-ring 69 is clamped between the base portion 51 of the connector unit 50 and the inner wall of the top portion 81 (see FIG. 2) of the cover member 80 in a compressed state where the connector side O-ring 69 is compressed at a compression ratio that is within a specified range. Thereby, the connector side O-ring 69 gas-tightly or liquid-tightly (fluid-tightly) seals between the connector unit 50 and the cover member 80.

Figure 8:
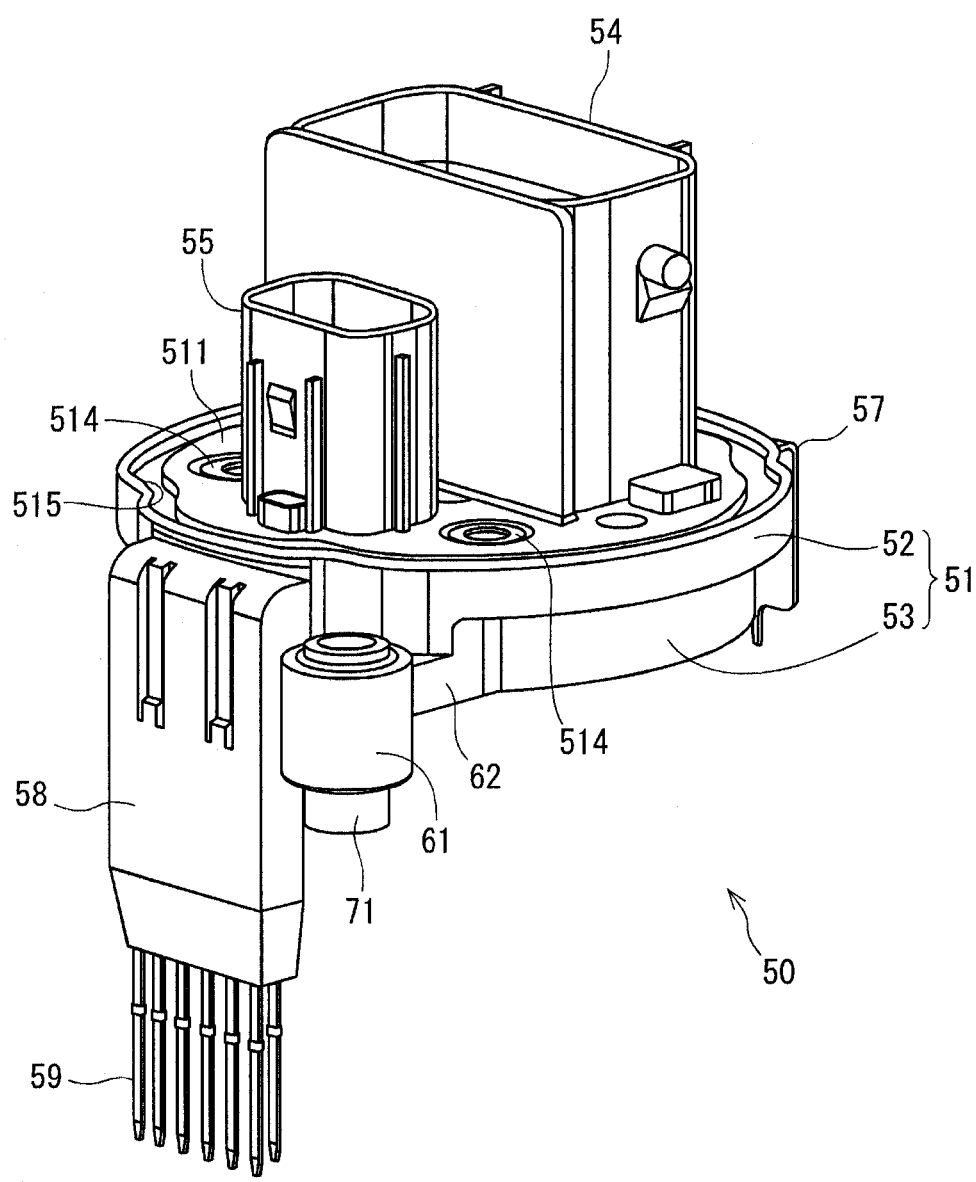
FIG. 8 is a perspective view showing the connector unit according to the first embodiment.

As shown in, for example, FIG. 8, the electric power supply connector 54 and the signal connector 55 are formed in the first base end surface 511. The electric power supply connector 54 and the signal connector 55 open to the first side, and electric power supply connector 54 and the signal connector 55 are formed such that the corresponding wirings are connectable to the electric power supply connector 54 and the signal connector 55 from the first side. The electric power supply connector 54 is used to connect with the battery. The signal connector 55 is used to connect with the torque sensor 104 (see FIG. 1) and a controller area network (CAN). In the present embodiment, the electric power supply connector 54 and the signal connector 55 serve as connector portions, respectively.

As shown in FIGS. 13 and 17, the electric power supply terminals 57 include an electric power source terminal 571 and a ground terminal 572. The electric power source terminal 571 and the ground terminal 572 are connected to the battery and the ground, respectively, through electric power supply connector 54.

The electric power source terminal 571 and the ground terminal 572 radially outwardly project from one of two diametrically opposite sides of the peripheral wall 525 of the main base portion 52, at which the power modules 45 are not placed, and then the electric power source terminal 571 and the ground terminal 572 are bent toward the second side. A distal end of the electric power source terminal 571 and a distal end of the ground terminal 572 are inserted through corresponding terminal inserting holes, respectively, of the power circuit board 43 and are electrically connected to the power circuit board 43 through, for example, soldering. Thereby, the electric power can be supplied to the power circuit board 43 as well as the control circuit board 41, the power modules 45 and the windings of the electric motor 10, which are electrically connected to the power circuit board 43.

When each of the electric power source terminal 571 and the ground terminal 572 is viewed from the first side, at least a part of a projecting portion of the terminal 571, 572, which projects from the main base portion 52, and at least a part of a connecting portion of the terminal 571, 572, which is connected to the power circuit board 43, do not overlap with each other. In the present embodiment, the distal end of the electric power source terminal 571 is displaced toward the ground terminal 572 side. Furthermore, the distal end of the ground terminal 572 is displaced toward the electric power source terminal 571 side. In this way, when the electric power source terminal 571 and the ground terminal 572 are viewed from the first side, the connecting state of the electric power source terminal 571 and the ground terminal 572 to the power circuit board 43 can be visually checked.

Figure 5:
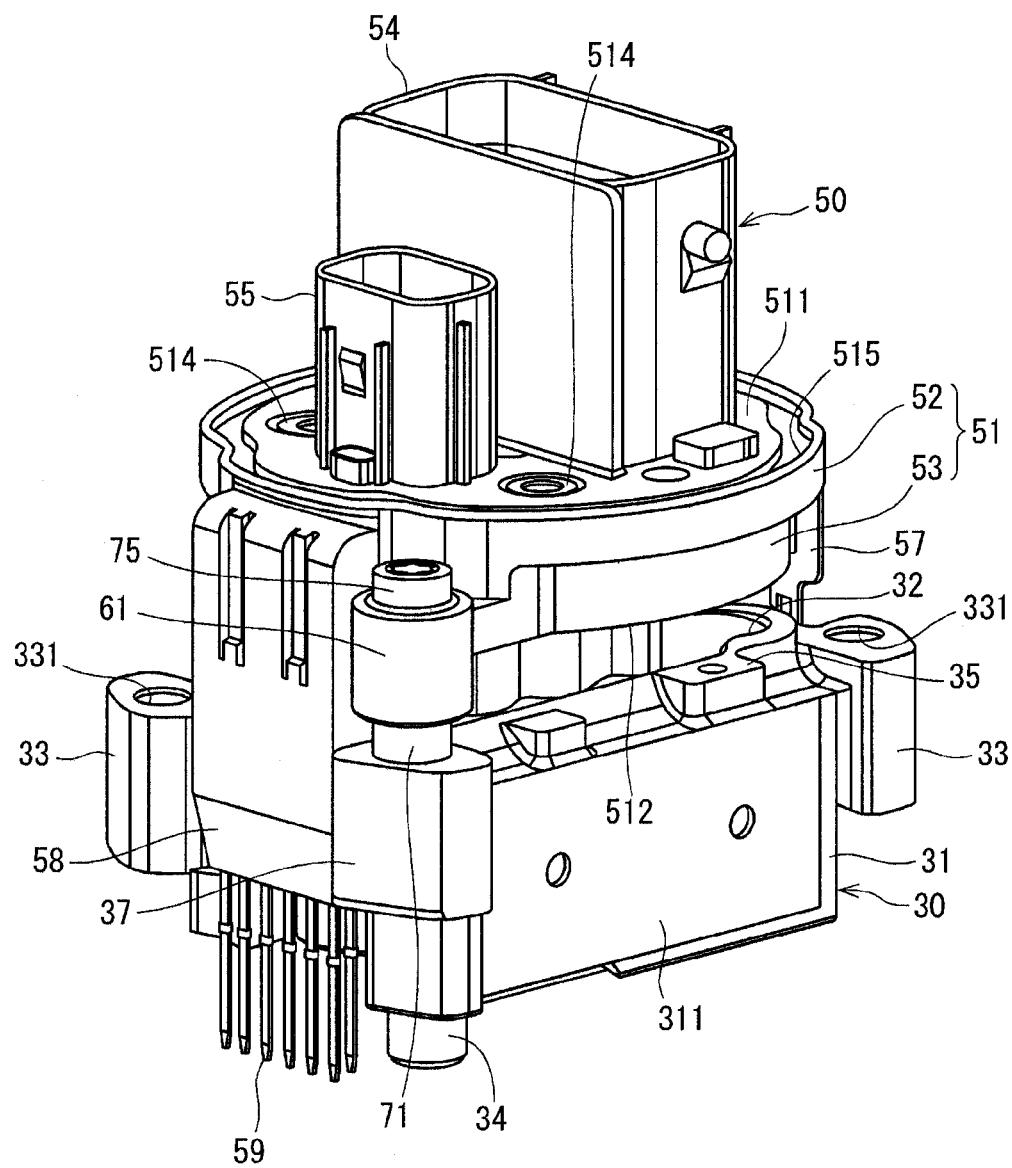
FIG. 5 is a perspective view showing a state where a connector unit is installed to a heat sink according to the first embodiment.
Figure 6:
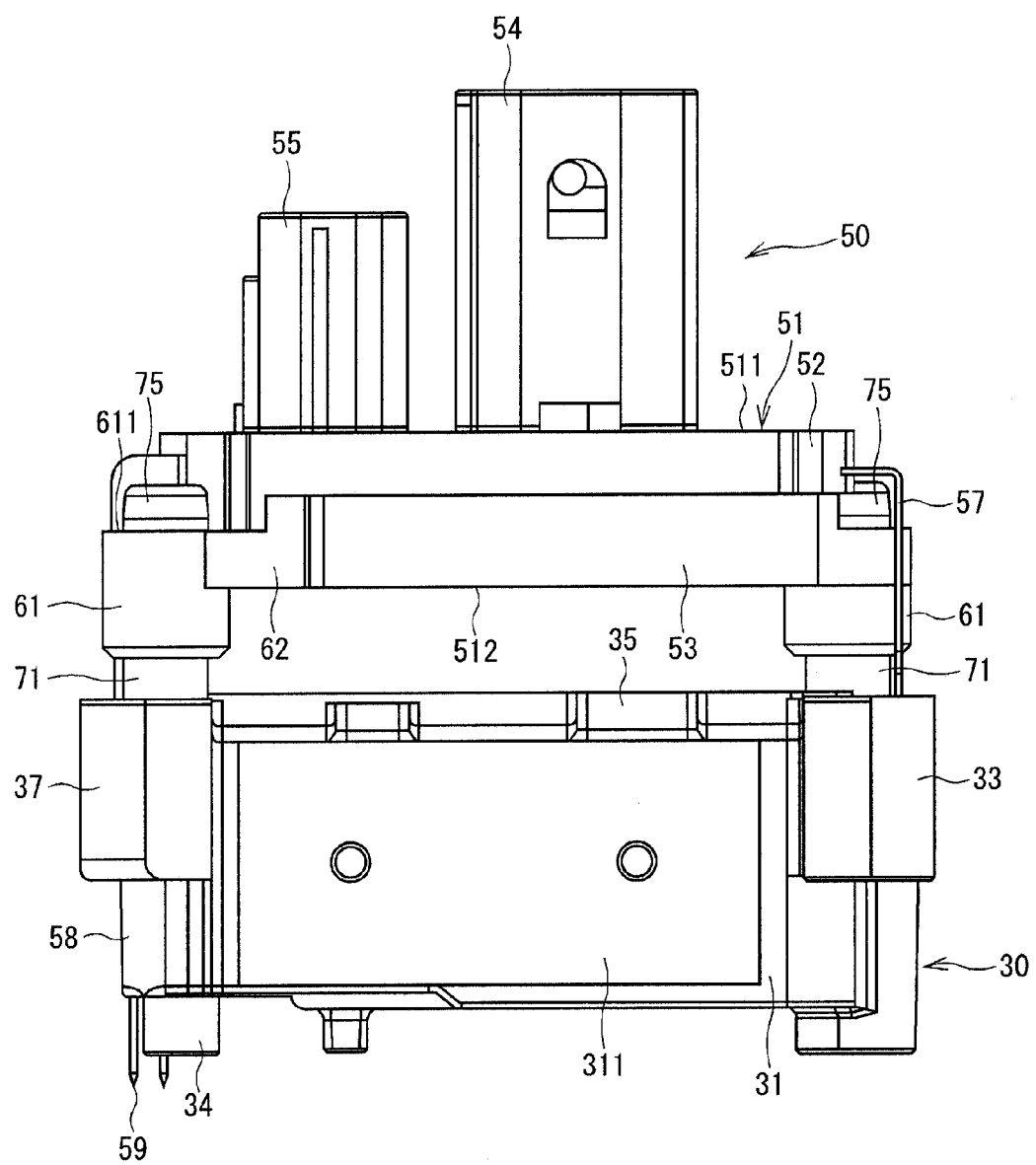
FIG. 6 is a side view showing a state where the connector unit is installed to the heat sink according to the first embodiment.
Figure 7:
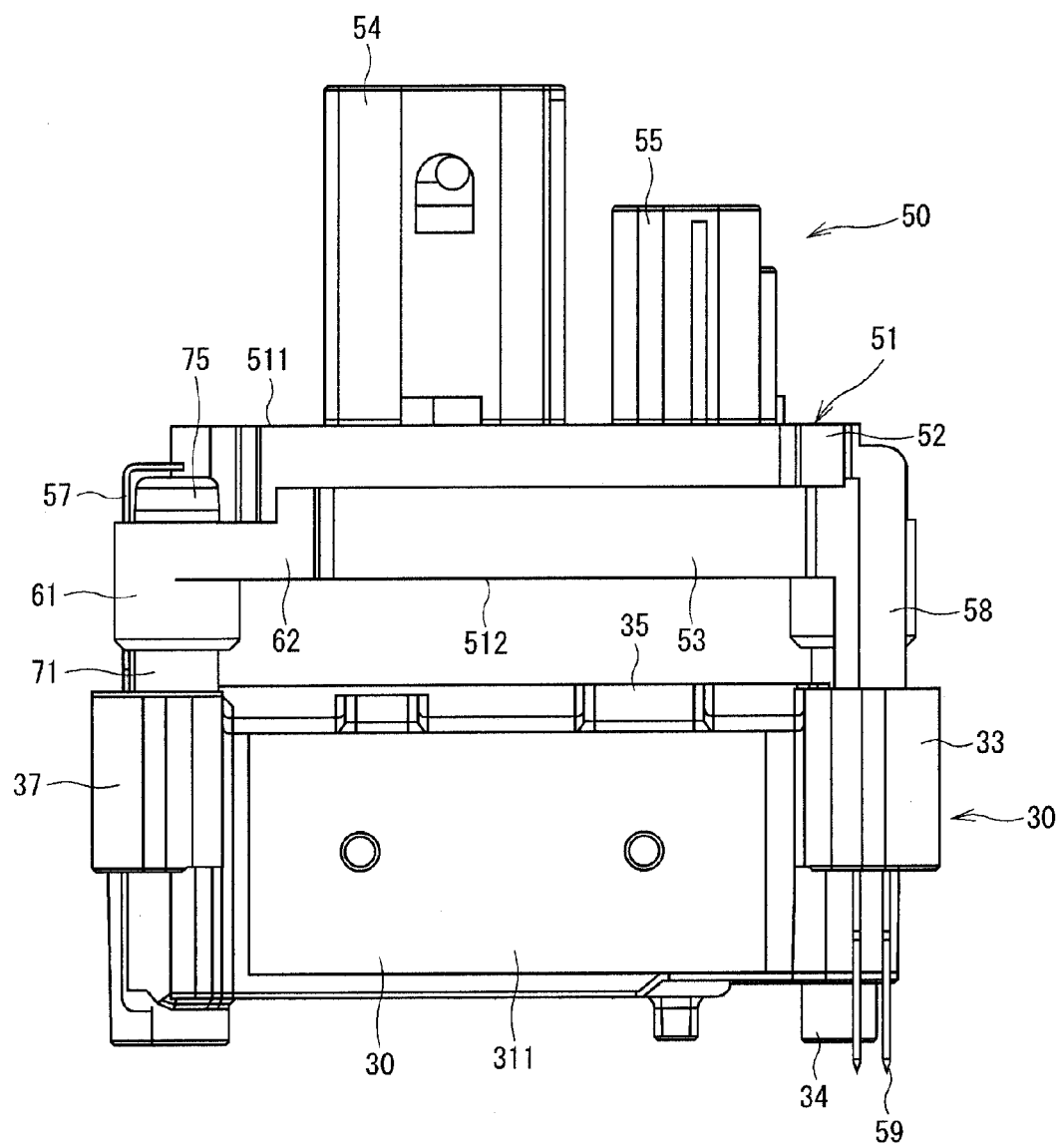
FIG. 7 is another side view showing the state where the connector unit is installed to the heat sink according to the first embodiment.

The signal terminal holding portion 58 projects from the base portion 51 toward the second side at the diametrically opposite side of the base portion 51 that is diametrically opposite from the electric power supply terminals 57, and the signal terminal holding portion 58 extends to an intermediate position of the heat sink 30 (see FIG. 5). With this configuration, electrical insulation between the heat sink 30 and the signal terminals 59 can be ensured. A distal end side of the signal terminal holding portion 58 is received in a recess that is formed in a side surface of the heat sink 30, at which none of the power modules 45 is placed. In the present embodiment, the signal terminal holding portion 58 is placed between the corresponding inserting hole forming portion 33 and the corresponding connector fixing portion 37 such that the signal terminal holding portion 58 is located on the inner side of the inserting hole forming portion 33 and the connector fixing portion 37. With this configuration, the signal terminals 59 are guided to the control circuit board 41 without increasing a radial size.

The signal terminals 59 project on the second side of the signal terminal holding portion 58. Distal ends of the signal terminals 59 are inserted through corresponding terminal inserting holes of the control circuit board 41 and are electrically connected to the control circuit board 41 through, for example, soldering. The signal terminals 59 are used to transmit respective signals inputted from the signal connector 55. Thereby, signals outputted from, for example, the torque sensor 104 and the CAN can be used at, for example, the microcomputer installed to the control circuit board 41.

In the present embodiment, the number of the signal terminals 59 is seven. However, the number of the signal terminals 59 should not be limited to seven and may be arbitrarily changed depending on, for example, the number of signals.

Each of the leg portions 61 and the corresponding one of the connecting portions 62 radially outwardly project from the base portion 51. In the present embodiment, the leg portion 61 is a cylindrical portion, and the connecting portion 62 is a portion that extends from the base portion 51 to the leg portion 61. In the following discussion, a position in the axial direction, i.e., a position in the top-to-bottom direction in FIG. 10 will be defined as a height portion.

The number of the leg portions 61 is two, and these leg portions 61 are formed at two locations, respectively, which correspond to the connector fixing portions 37 of the heat sink 30. Specifically, one of the two leg portions 61 is placed adjacent to the electric power supply terminals 57, and the other one of the two leg portions 61 is placed adjacent to the signal terminal holding portion 58. In the present embodiment, the leg portion 61, which is adjacent to the signal terminal holding portion 58, is formed continuously with the signal terminal holding portion 58 through the connecting portion 62. Furthermore, the two leg portions 61 are generally symmetrically arranged about the axis of the electric motor 10.

Each leg portion 61 is shaped into a generally cylindrical tubular form, and the corresponding collar 71 is inserted in the leg portion 61. In the present embodiment, a first side end surface of the leg portion 61, which is located on the first side, will be referred to as a first end surface 611, and a second side end surface of the leg portion 61, which is located on the second side, will be referred to as a second end surface 612.

As shown in FIG. 16, the first end surface 611 of the leg portion 61 is placed at the same height as a first side end surface 621 of the connecting portion 62, which is located on the first side. Furthermore, a second side end surface 622 of the connecting portion 62, which is located on the second side, is placed at the same height as that of the second base end surface 512 of the base portion 51. A size of the leg portion 61 in the axial direction is larger than that of the connecting portion 62, and the second end surface 612 of the leg portion 61 is placed on the second side of the second base end surface 512.

That is, the height position of the first end surface 611 of the leg portion 61 and the height position of the first side end surface 621 of the connecting portion 62 are between the first base end surface 511 and the second base end surface 512 of the base portion 51. The second base end surface 512 of the base portion 51 is placed between the first end surface 611 of the leg portion 61 (and thereby the first side end surface 621 of the connecting portion 62) and the second end surface 612 of the leg portion 61.

The collar 71 is made of, for example, metal and is shaped into a cylindrical tubular form in such a manner that an outer diameter of the collar 71 coincides with an inner diameter of the leg portion 61. The collar 71 projects from both of the first end surface 611 and the second end surface 612 of the leg portion 61 in the axial direction. A second side end portion 712 of the collar 71 contacts the connector fixing portion 37 of the heat sink 30. A first side end portion 711 of the collar 71 contacts the corresponding connector fixing screw 75. Wearing of the leg portion 61, which would be caused by screwing, can be limited by installing the collar 71 into the inside of the leg portion 61.

A corresponding one of the connector fixing screws 75 is inserted into the leg portion 61 and the collar 71. The connector fixing screws 75 are fixed to the connector fixing portions 37, respectively, of the heat sink 30. Thereby, the connector unit 50 is fixed to the heat sink 30.

The drive device 1 of the present embodiment is used in the electric power steering apparatus 109 of the rack assist type and is installed in an engine room (not shown) of the vehicle (see FIG. 1). Therefore, the drive device 1 has a waterproof structure to limit intrusion of water into an inside of the drive device 1. Specifically, in order to limit the intrusion of the water into the inside of the drive device 1, the motor side O-ring 14 and the connector side O-ring 69 are installed to the drive device 1.

As discussed above, the connector side O-ring 69 is installed to the first base end surface 511 of the base portion 51 of the connector unit 50 (see FIG. 9). The connector unit 50 is fixed to the heat sink 30 with the connector fixing screws 75, which are inserted into the leg portions 61, respectively.

Figure 19:
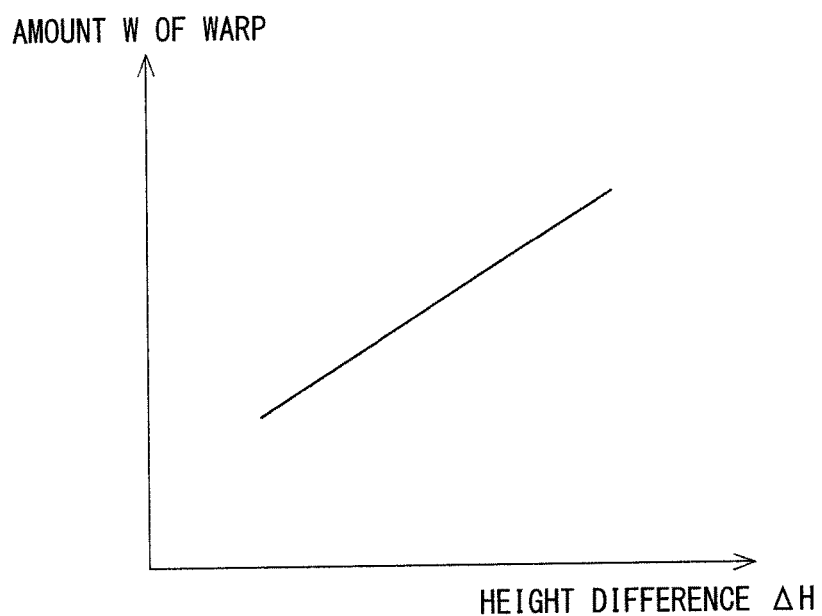
FIG. 19 is a descriptive diagram showing a relationship between a height difference, which is measured between a first base end surface of a base portion and a first end surface of a leg portion in the connector unit, and the amount of warp of the first base end surface according to the first embodiment.

FIG. 19 shows a relationship between a height difference ΔH (see FIGS. 16 and 18), which is axially measured between the first base end surface 511 (O-ring installation surface) of the base portion 51 and the first end surface 611 of the leg portion 61, and the amount W of warp of the first base end surface 511 at the time of applying the thermal load to first base end surface 511. The amount W of warp of the first base end surface 511 is the amount of displacement of the first base end surface 511 from a reference position toward the first side or the second side. As shown in FIG. 19, when the height difference ΔH is increased, the amount W of warp of the first base end surface 511 is increased at the time of applying the thermal load to the first base end surface 511. When the amount of warp of the first base end surface 511 toward the first side is increased, the compression ratio of the connector side O-ring 69 is increased. When the compression ratio of the connector side O-ring 69 is increased and falls out of a standard range, it may possibly lead to a damage (e.g., cracking) of the connector side O-ring 69. Furthermore, when the amount of warp of the first base end surface 511 toward the second side is increased, the compression ratio of the connector side O-ring 69 is reduced. When the compression ratio of the connector side O-ring 69 is reduced and falls out of the standard range, it may possibly lead to intrusion of, for example, water into the inside of the drive device 1 through a gap.

Thus, in the present embodiment, the height difference ΔH is minimized, to reduce the amount W of warp of the first base end surface 511. Specifically, each leg portion 61 and the corresponding connecting portion 62 are formed such that the first end surface 611 of the leg portion 61 is placed on the first side of the second base end surface 512 of the base portion 51.

Furthermore, in the present embodiment, the height difference ΔH is set such that a top end 751 of the connector fixing screw 75, which is the first side end portion of the connector fixing screw 75, does not project from the first base end surface 511. Specifically, as shown in FIGS. 16 and 18, the leg portion 61 is formed such that the height difference ΔH is larger than a sum of the amount C of projection of the collar 71 from the first end surface 611 and a height S of a head 75a of the connector fixing screw 75. When the leg portion 61 is formed such that the top end 751 of the connector fixing screw 75 is located on the second side of the first base end surface 511, it is possible to limit interference between the top end 751 of the connector fixing screw 75 and an inside surface of the top portion 81 of the cover member 80, which is generally planar plate form.

As discussed above, the drive device 1 includes the heat sink 30, the connector unit 50, the cover member 80 and the connector side O-ring 69.

The heat sink 30 is placed on the one side of the electric motor 10 in the axial direction.

The connector unit 50 includes the electric power supply connector 54, the signal connector 55, the base portion 51 and the leg portions 61 and is fixed to the opposite side of the heat sink 30, which is opposite from the electric motor 10. The electric power supply connector 54 and the signal connector 55 are formed such that the corresponding wirings are connectable to the electric power supply connector 54 and the signal connector 55. The electric power supply connector 54 and the signal connector 55 are formed in the base portion 51. The leg portions 61 are formed at the outer peripheral edge of the base portion 51 and are used to connect with the heat sink 30.

The cover member 80 receives the connector unit 50 and the heat sink 30 in the state where the electric power supply connector 54 and the signal connector 55 are exposed from the cover member 80.

The connector side O-ring 69 is installed between the base portion 51 and the cover member 80.

In the present embodiment, the one side of the connector unit 50, which is opposite from the electric motor 10, is defined as the first side, and the other side of the connector unit 50, at which the electric motor 10 is placed, is defined as the second side. The connector side O-ring 69 is placed at the first base end surface 511 that is the end surface of the base portion 51 located on the first side. The height position of the first end surface 611 of the leg portion 61, which is the first side end surface of the leg portion 61 located on the first side, is on the first side of the second base end surface 512 of the base portion 51 that is the other end surface of the base portion 51 located on the second side. Specifically, the height position of the first end surface 611 is between the first base end surface 511 and the second base end surface 512.

In the present embodiment, the connector side O-ring 69 is installed between the base portion 51 and the cover member 80, so that it is possible to gas tightly or liquid tightly seal between the connector unit 50 and the cover member 80.

Furthermore, the height position of the first end surface 611 is set on the first side of the second base end surface 512, so that the height difference ΔH between the first end surface 611 and the first base end surface 511 (the installation surface of the connector side O-ring 69) is minimized. In this way, in comparison to the case where the first end surface 611 is located on the second side of the second base end surface 512, it is possible to limit the amount W of warp of the first base end surface 511 caused by the thermal load, and thereby it is possible to limit the deviation of the compression ratio of the connector side O-ring 69 out of the standard range (specified range). Thus, it is possible to limit the deterioration of the waterproofness of the drive device 1 caused by the thermal load.

The connecting portion 62 is formed between the base portion 51 and the leg portion 61. In this way, the leg portion 61 can be placed at an appropriate location according to the shape of the heat sink 30.

The connecting portion 62 is formed such that the height position of the first side end surface 621 of the connecting portion 62 is equal to the height position of the first end surface 611 of the leg portion 61, and the height position of the second side end surface 622 of the connecting portion 62 is equal to the height position of the second base end surface 512 of the base portion 51, which is located on the second side. With this construction, the shape of the connecting portion 62 can be simplified.

The drive device 1 includes the connector fixing screws 75 fixed to the heat sink 30.

The height position of the top end 751, which is the first side end portion of the connector fixing screw 75, is set to be on the second side of the first base end surface 511. In other words, the connector fixing screw 75 does not project from the first base end surface 511. With this construction, the top portion 81 of the cover member 80 and the connector fixing screws 75 do not interfere with each other, and thereby the connector side O-ring 69 can be appropriately placed between the cover member 80 and the first base end surface 511.

The drive device 1 includes the collars 71, each of which is placed between the corresponding leg portion 61 and the corresponding connector fixing screw 75 and contacts the heat sink 330 through the second side end portion 712 of the collar 71. For example, in the case where the leg portions 61 are made of the resin, the installation of the collars 71 made of, for example, the metal to the leg portions 61 can limit the wearing of the leg portions 61 caused by the screwing of the leg portions 61 with the connector fixing screws 75.

The base portion 51 includes the main base portion 52, in which the electric power supply connector 54 and the signal connector 55 are formed, and the reinforcing portion 53, which projects from the main base portion 52 toward the second side. The provision of the reinforcing portion 53 enables further reduction of the amount W of warp of the first base end surface 511 caused by the thermal load.

Second Embodiment

Figure 20:
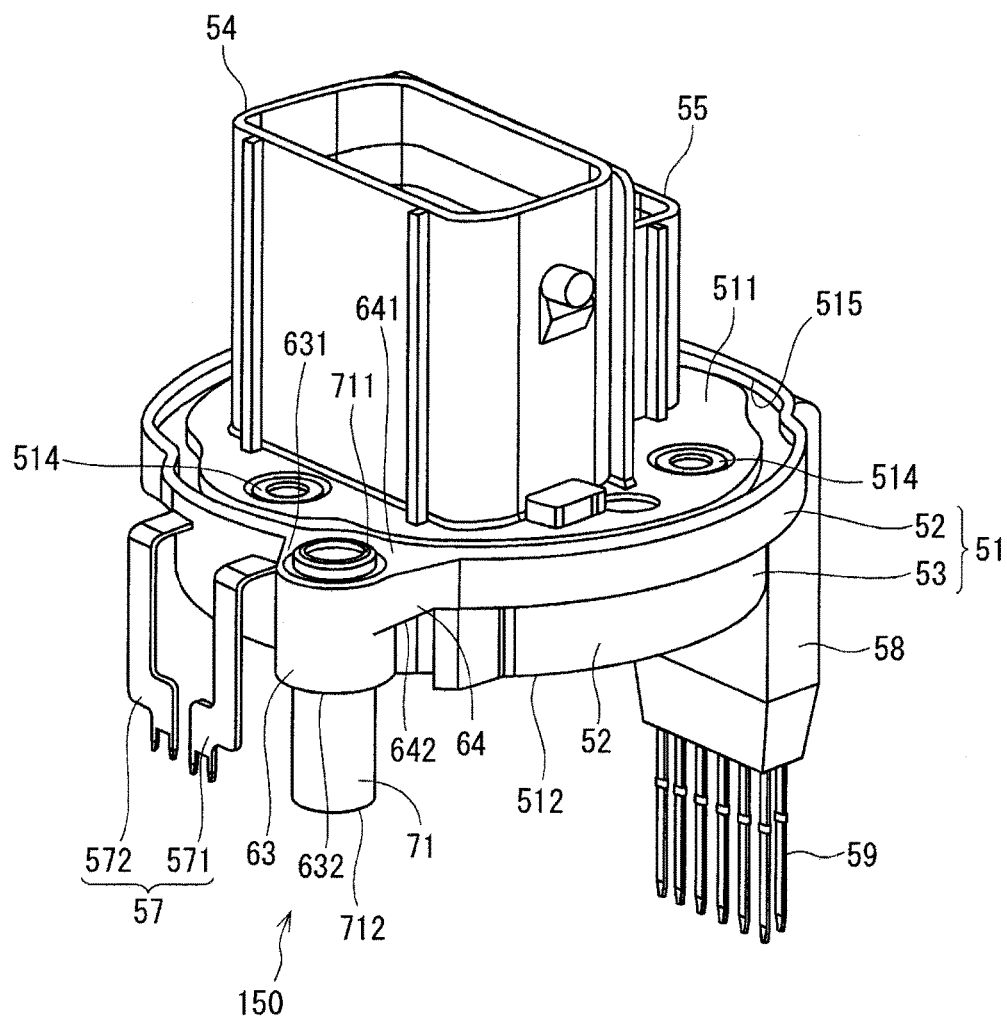
FIG. 20 is a perspective view showing a connector unit according to a second embodiment of the present disclosure.
Figure 21:
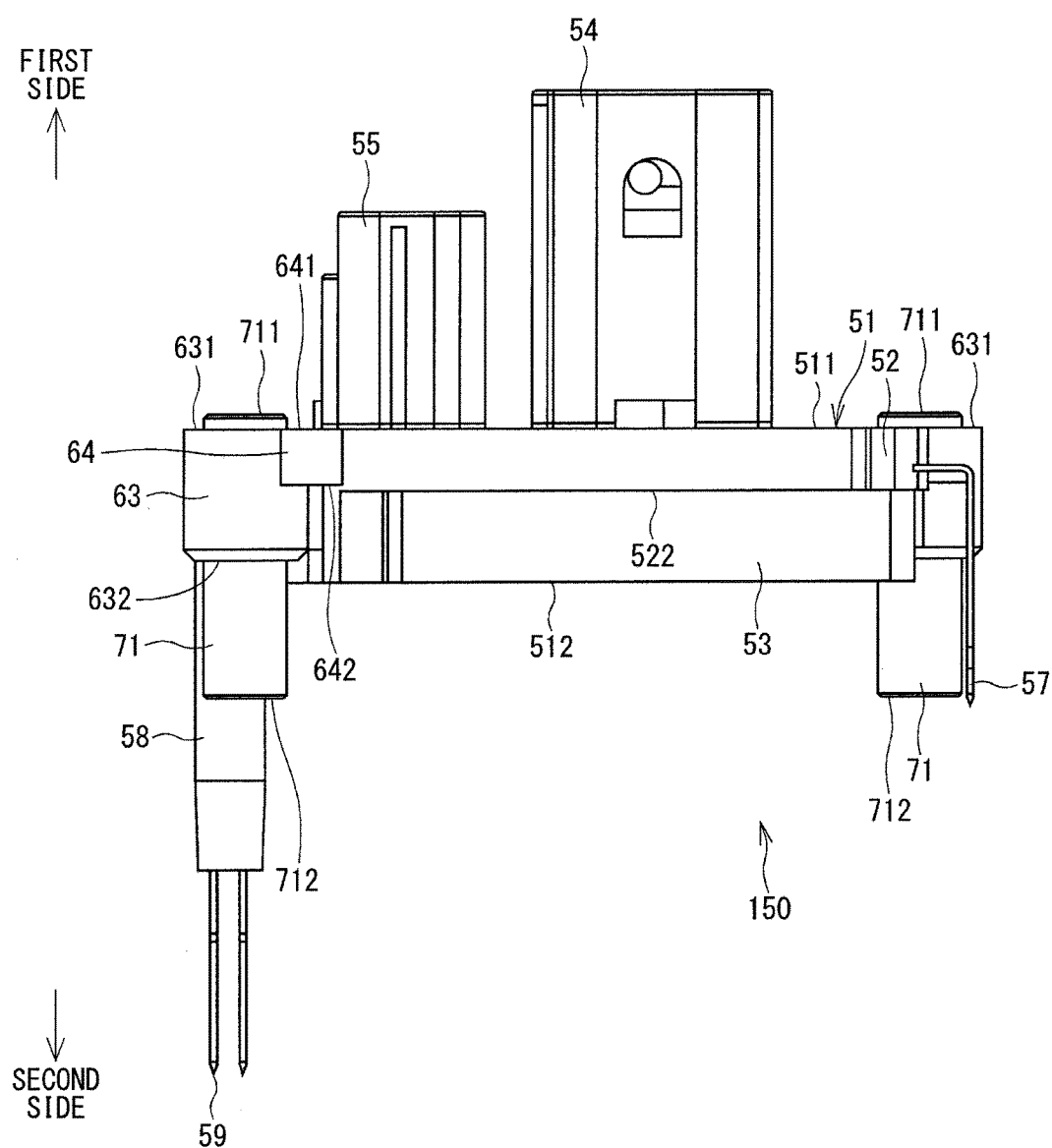
FIG. 21 is a side view showing the connector unit according to the second embodiment.
Figure 22:
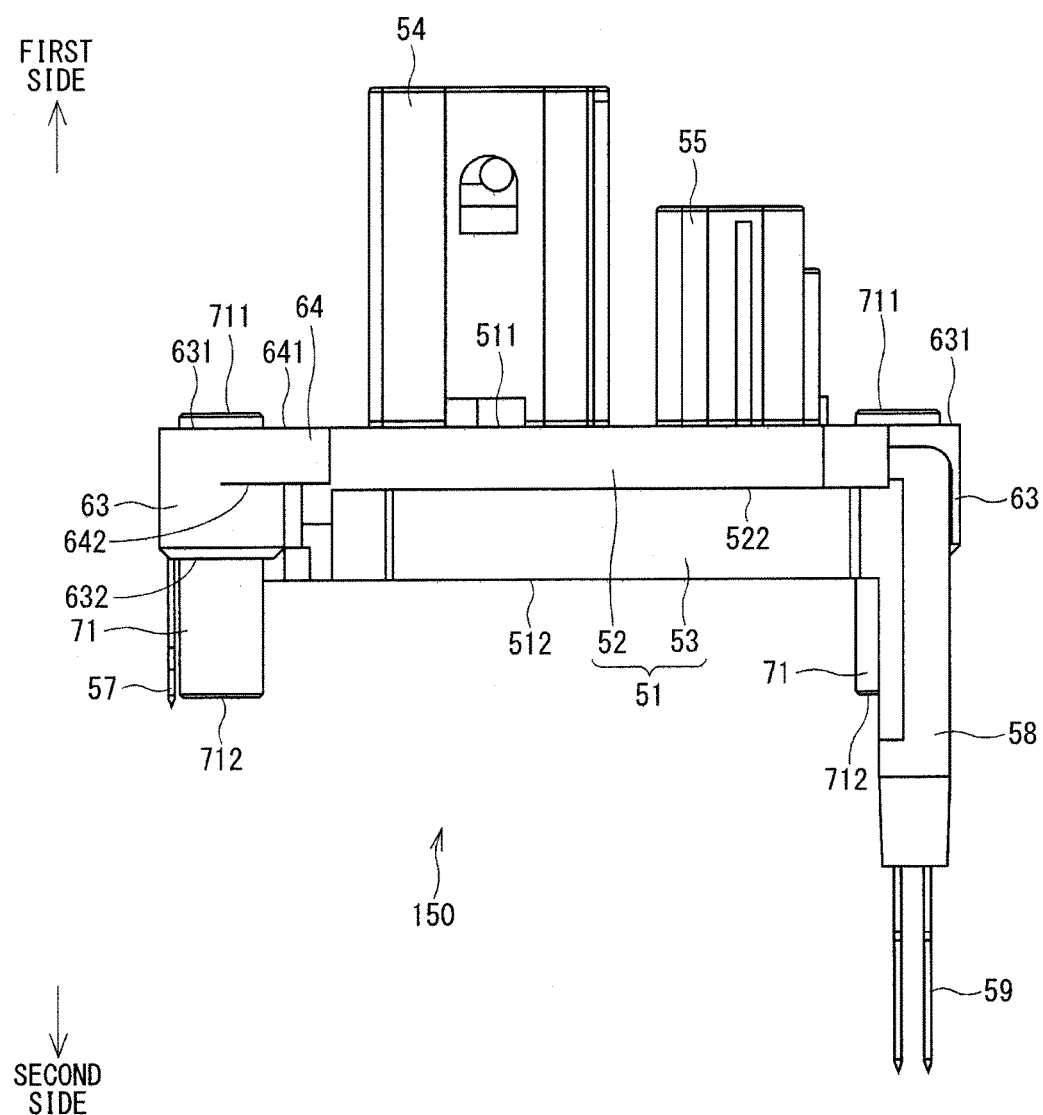
FIG. 22 is a side view showing the connector unit according to the second embodiment.

A second embodiment of the present disclosure will be described with reference to FIGS. 20 to 22.

In the present embodiment, leg portions 63 and connecting portions 64 of a connector unit 150 are different from the leg portions 61 and the connecting portions 62 of the connector unit 50 of the first embodiment. Therefore, in the following discussion, these components will be mainly described. In the present embodiment, a first side end surface of each leg portion 63, which is located on the first side, will be referred to as a first end surface 631, and a second side end surface of the leg portion 63, which is located on the second side, will be referred to as a second end surface 632.

In the present embodiment, a height position of the first end surface 631 of the leg portion 63 and a height position of a first side end surface 641 of the connecting portion 64 are the same as the height position of the first base end surface 511 of the base portion 51. That is, the height difference ΔH between the first base end surface 511 and the first end surface 631 is zero (0). With this construction, the amount W of warp of the first base end surface 511 can be minimized. Furthermore, it is desirable that head receiving chambers, such as recesses, which receive the heads 75a of the connector fixing screws 75, respectively, are formed in the cover member 80 to limit interference between the cover member 80 and the connector fixing screw 75.

Furthermore, a height position of the second end surface 632 of each leg portion 63 and a height position of a second side end surface 642 of each connecting portion 64 are set to be on the first side of the second base end surface 512 of the base portion 51. Furthermore, the height position of the second side end surface 642 of each connecting portion 64 is set to be on the first side of the second side end surface 522 of the main base portion 52 of the base portion 51 (see FIGS. 21 and 22).

Even with this construction, the advantages, which are similar to those of the first embodiment, can be achieved.

Other Embodiments (A) Connector Unit

In the above embodiments, the leg portions, which are used to connect between the connector unit and the heat sink, are formed at the two locations, respectively. In another embodiment, the leg portions may be provided to three or more locations, respectively. Furthermore, the number of the cover fixing portions of the connector unit, the number of the inserting hole forming portions of the heat sink, the number of the control circuit board fixing portions, the number of the power circuit board fixing portions, and the number of the connector fixing portions may be any number that is equal to or larger than two.

In the above embodiments, the connector unit is made of the resin. In another embodiment, at least a portion or the whole of the connector unit may be made of a material that is other than the resin. For example, the leg portions may be made of metal. In the case where the leg portions are made of the metal, the collars may be eliminated.

In the above embodiments, the connector fixing screws serve as the fixing members of the present disclosure. In another embodiment, the fixing members may be other elements that are other than the screws. Furthermore, the leg portions and the heat sink may be fixed together by, for example, a bonding agent to eliminate the fixing members.

In the above embodiments, the connector unit has the electric power supply connector and the signal connector as the two connector portions. In another embodiment, the number of the connector portions formed in the connector unit is not limited to two and may be one or three or more. In the above embodiments, the electric power supply connector and the signal connector open on the first side, and the wirings are connected to the electric power supply connector and the signal connector from the first side. In another embodiment, the opening side (the opening direction) of the connectors is not limited to the first side and may be, for example, a radially outer side (a radial direction).

In the above embodiments, the reinforcing portion is formed in the base portion. In another embodiment, the reinforcing portion may be eliminated.

(B) Controller Unit

In the above embodiment, the control circuit board, the power circuit board, the power modules and the connector unit are fixed to the heat sink. In another embodiment, the holding member may not have the function of the heat sink depending on a need. In such a case, the holding member may be made of any suitable material without considering the heat conductivity.

The controller unit of the embodiment includes the two circuit boards, i.e., the control circuit board and the power circuit board. In another embodiment, the number of the circuit boards is not limited to two and may be one or three or more.

Each of the power modules of the above embodiments is fixed to the heat sink such that the control terminals are located on the control circuit board side, and the power terminals and the motor terminals are located on the power circuit board side. In another embodiment, the shapes and the fixing locations of these terminals of the power module to the heat sink may be freely changed. Furthermore, in the above embodiments, the switching devices, which form the corresponding one of the inverters, are modularized as the one power module. In another embodiment, these switching devices may not be modularized and may be, for example, surface mounted on a circuit board.

(C) Drive Device

In the above embodiments, the electric motor is the three-phase AC motor. In another embodiment, the electric rotating machine is not limited to the three-phase AC motor and may be, for example, a DC motor. Furthermore, the electric rotating machine may be a motor generator that has a function of an electric motor and a function of an electric power generator.

In the above embodiments, the drive device is applied to the electric power steering apparatus of the rack assist type. In another embodiment, the drive apparatus of the present disclosure may be applied to another type of electric power steering apparatus, such as an electric power steering apparatus of a column assist type. Furthermore, the drive device of the present disclosure may be applied to another apparatus that is other than the electric power steering apparatus.

The present disclosure should not be limited to any of the above embodiments, and the above embodiments may be further modified in various ways without departing form the scope of the present disclosure.

What is claimed is:

1. A drive device comprising:
an electric rotating machine;
a holding member that is placed on one side of the electric rotating machine in an axial direction;
a connector unit that is fixed to a side of the holding member, which is opposite from the electric rotating machine in the axial direction, wherein the connector unit includes:
 a connector portion, which is formed to be connectable with an electric wiring;
 a base portion, in which the connector portion is formed, the base portion including a first base end surface and a second base end surface, the first and second base end surfaces being disposed on opposite sides of the base portion in the axial direction; and
 a leg portion, which is formed at an outer peripheral edge of the base portion and is used to connect the connector unit to the holding member;
a cover member that receives the connector unit and the holding member in a state where the connector portion is exposed from the cover member; and
a seal member that is placed between the base portion and the cover member, wherein:
one side of the connector unit, which is opposite from the electric rotating machine in the axial direction, is defined as a first side;
another side of the connector unit, which is opposite from the first side in the axial direction, is defined as a second side;
the seal member is placed at the first base end surface of the base portion located on the first side; and
an axial position of a first side end surface of the leg portion is located on the first side,
wherein a connecting portion is formed between the base portion and the leg portion, and
a height position of a first side end surface of the connecting portion, which is located on the first side, is the same height position as the first side end surface of the leg portion.

2. The drive device according to claim 1, wherein:
a height position of a second side end surface of the connecting portion, which is located on the second side, is the same as a height position of the second base end surface.

3. The drive device according to claim 1, further comprising a fastener that is inserted into the leg portion and is fixed to the holding member, wherein a height position of a first side end portion of the fastener, which is located on the first side, is located adjacent to the first side end surface of the leg portion.

4. The drive device according to claim 3, further comprising a collar that is placed between the leg portion and the fastener, wherein a first side end portion of the collar, which is located on the first side, contacts the fastener, and a second side end portion of the collar, which is located on the second side, contacts the holding member.

5. The drive device according to claim 1, wherein the base portion includes:
- a main base portion, in which the connector portion is formed; and
- a reinforcing portion, which projects from the main base portion toward the second side.

* * * * *